US012233646B2

(12) United States Patent
Cooke

(10) Patent No.: US 12,233,646 B2
(45) Date of Patent: Feb. 25, 2025

(54) CONTINUOUS INK JET PRINTER AND PRINT HEAD ASSEMBLY THEREFOR

(71) Applicant: Linx Printing Technologies Limited, St. Ives (GB)

(72) Inventor: Stephen John Cooke, St. Ives (GB)

(73) Assignee: Linx Printing Technologies Limited, St Ives (GB)

( * ) Notice: Subject to any disclaimer, the term of this patent is extended or adjusted under 35 U.S.C. 154(b) by 478 days.

(21) Appl. No.: 17/629,504

(22) PCT Filed: Jul. 22, 2020

(86) PCT No.: PCT/GB2020/051745

§ 371 (c)(1),
(2) Date: Jan. 24, 2022

(87) PCT Pub. No.: WO2021/014148

PCT Pub. Date: Jan. 28, 2021

(65) Prior Publication Data

US 2022/0242117 A1 Aug. 4, 2022

(30) Foreign Application Priority Data

Jul. 24, 2019 (GB) ...................................... 1910570

(51) Int. Cl.
*B41J 2/085* (2006.01)
*B41J 2/02* (2006.01)
(Continued)

(52) U.S. Cl.
CPC ................. *B41J 2/085* (2013.01); *B41J 2/02* (2013.01); *B41J 2/08* (2013.01); *B41J 2/095* (2013.01);
(Continued)

(58) Field of Classification Search
CPC ..... B41J 2/085; B41J 2/095; B41J 2/08; B41J 2/14072; B41J 29/38; B41J 2/02; B41J 2/41
See application file for complete search history.

(56) References Cited

U.S. PATENT DOCUMENTS 4,314,258 A * 2/1982 Donahue .................... B41J 2/09
347/77
4,800,398 A 1/1989 Naruse et al.
(Continued)

FOREIGN PATENT DOCUMENTS

CN 1070610 A 4/1993
CN 1302259 A 7/2001
(Continued)

OTHER PUBLICATIONS

PCT/GB2020/051745 International Search Report and Written Opinion, dated Oct. 21, 2020, 13 pages.
(Continued)

*Primary Examiner* — Yaovi M Ameh
(74) *Attorney, Agent, or Firm* — DeLizio, Peacock, Lewin & Guerra LLP

(57) ABSTRACT

The print head cover (83) of an electrostatic deflection inkjet printer is made of a material having an electrical surface resistivity of no more than $10^{12}$ ohms per square or an electrical volume resistivity of no more than $10^9$ ohm metres and is electrically connected to an earth line (93, 97). This prevents build-up of electric charge on the cover (83). The resistance from the surface of the cover (83) to a place where a cover earth line (93) joins a signal earth line (97) or enters the umbilical (7) is at least 16000 times the resistance from that place to earth. This prevents an electrostatic discharge to the cover (83) disrupting the electronic circuits. The high resistance earth connection for the cover (83) avoids the
(Continued)

need for an earthing wire braid in the umbilical (7). The cover (83) may be moulded from an antistatic or static dissipative material.

20 Claims, 9 Drawing Sheets

(51) Int. Cl.

| | |
|---|---|
| ***B41J 2/08*** | (2006.01) |
| ***B41J 2/095*** | (2006.01) |
| ***B41J 2/14*** | (2006.01) |
| ***B41J 2/41*** | (2006.01) |
| *B41J 29/38* | (2006.01) |

(52) U.S. Cl.

CPC ............ *B41J 2/14072* (2013.01); *B41J 2/41* (2013.01); *B41J 29/38* (2013.01)

(56) References Cited

U.S. PATENT DOCUMENTS

| | | | | |
|---|---|---|---|---|
| 5,874,983 | A * | 2/1999 | Nagahata | B41J 2/33575 347/205 |
| 8,919,934 | B2 | 12/2014 | Ikegawa et al. | |
| 2015/0352845 | A1* | 12/2015 | Okano | B41J 2/19 347/30 |
| 2018/0304626 | A1 | 10/2018 | Izawa et al. | |
| 2018/0333952 | A1 | 11/2018 | Smith et al. | |

FOREIGN PATENT DOCUMENTS

| | | | |
|---|---|---|---|
| CN | 1622882 | A | 6/2005 |
| CN | 101497265 | A | 8/2009 |
| CN | 106457831 | A | 2/2017 |
| CN | 109311320 | A | 2/2019 |
| CN | 208881368 | U | 5/2019 |
| EP | 0049100 | A2 | 4/1982 |
| GB | 1521889 | A | 8/1978 |
| GB | 2316364 | A | 2/1998 |
| GB | 2551156 | A | 12/2017 |
| GB | 2551321 | B | 6/2021 |
| JP | S63230353 | A | 9/1988 |
| JP | H11348254 | A | 12/1999 |
| JP | 2006076039 | A | 3/2006 |

OTHER PUBLICATIONS

Chinese Patent Office Action, including a search report, dated Jan. 9, 2023, for Chinese application 202080067057.7 received Mar. 10, 2023.

* cited by examiner

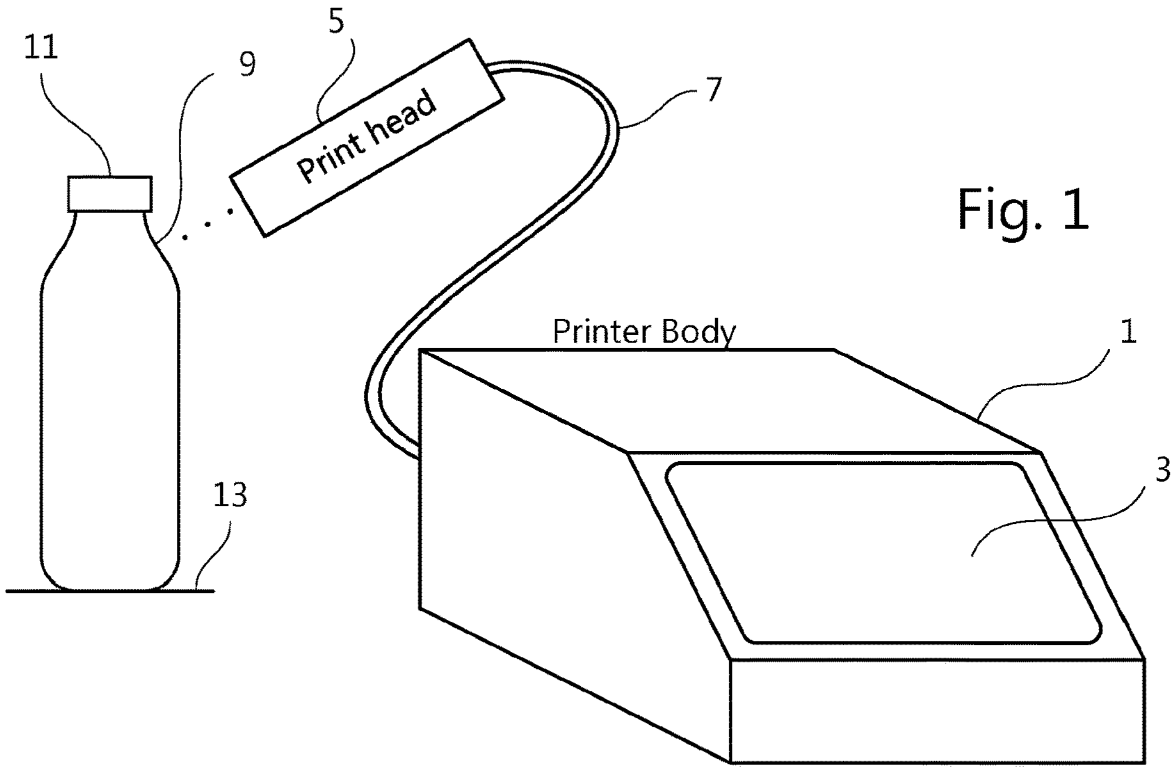
Fig. 1
Fig. 2
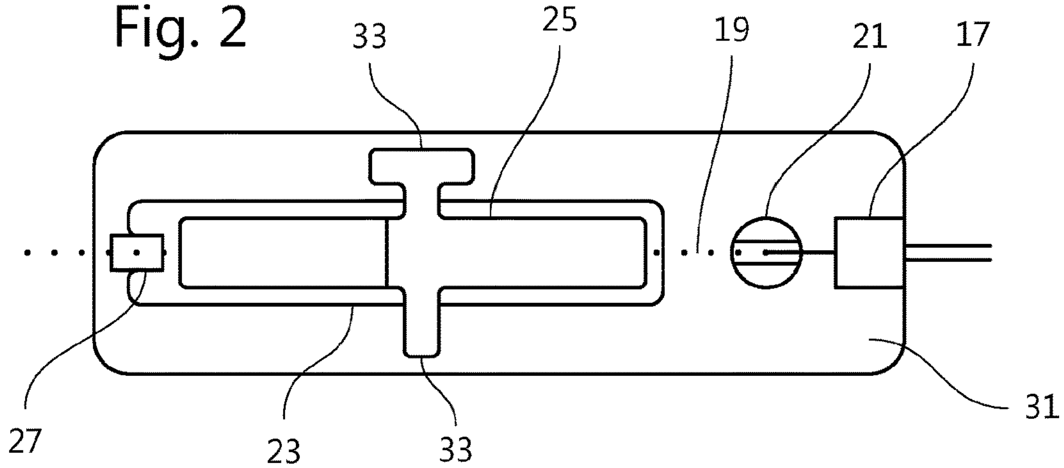
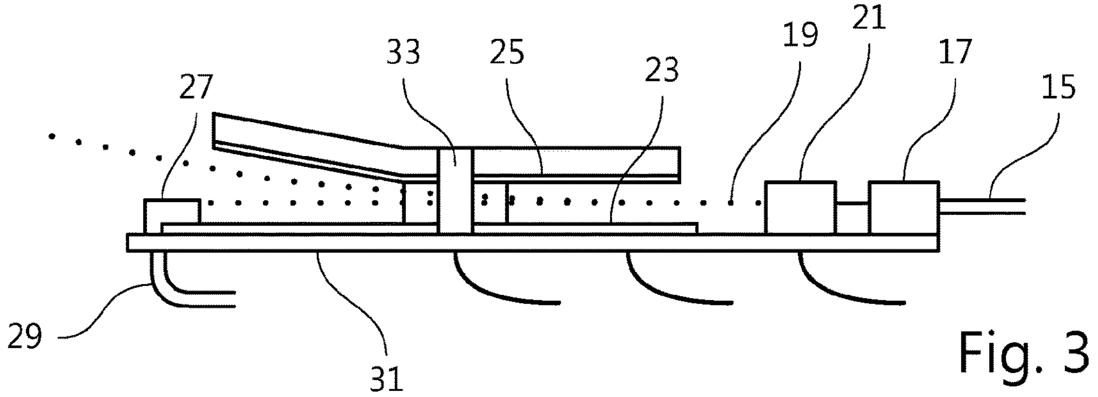
Fig. 3

CONTINUOUS INK JET PRINTER AND PRINT HEAD ASSEMBLY THEREFOR

FIELD OF THE INVENTION

The present invention relates to an electrostatic deflection continuous ink jet printer, for example an industrial printer suitable for printing onto a succession of objects carried past the printer on a conveyor in an industrial filling, packing or processing line. Typically the objects are products such as manufactured articles or packaged food stuffs and the printer is used to print product and batch information, "use by" dates etc. The present invention also relates to a print head assembly for such a printer.

In the operation of an electrostatic deflection continuous ink jet printer, a continuous jet of ink drops is formed at a print head of the printer. The print head comprises an arrangement of electrodes to trap electric charges on some or all of the ink drops and to create an electrostatic field to deflect the charged drops. The drops are deflected in flight so that only some drops are used for printing. Drops of ink that are not required for printing are caught by a gutter and are normally returned to an ink tank within a printer body of the printer. Usually the print head is connected to the printer body by a flexible conduit (sometimes called an umbilical) which is typically from 1 m to 6 m long.

BACKGROUND

The print head of an electrostatic deflection continuous ink jet printer usually has a metal cover that protects it from the environment, encloses the electrodes for reasons of electrical safety and for preventing external interference with the ink jet, and contains the atmosphere inside the print head cover to minimise mixing with the surrounding air. An opening (exit hole) in the cover allows drops of ink to exit for printing. During operation of the printer, very small drops of ink may be formed in the space enclosed by the print head cover in addition to the normal drops in the ink jet. Additionally, further very small drops may be formed by splashback when drops of ink hit the surface being printed onto. These very small drops may settle on nearby surfaces, which may include the print head cover especially at the end of the cover near the gutter and the opening by which ink drops leave. These very small drops may be electrically charged, and the charges will be trapped if they land on a surface that is electrically isolated. If a large trapped electric charge is allowed to build up, it will create an electric field that may interfere with the correct operation of the printer. Therefore the print head cover is normally earthed.

Because the print head cover is earthed it may receive electrostatic discharges. Typically these occur either when a person touches the cover, if the person is carrying an electrostatic electric charge, or when the printer is being used to print onto a plastic web that unwinds from a reel, generating electric charge as it unwinds. The electrostatic discharge will create a large transient current spike in the earth conductor from the print head cover to earth. The earth connection for the print head cover is usually provided by the printer body and the earth conductor usually comprises a metal braid or mesh running the length of the conduit. Metal braid or mesh is used in addition to or in place of a simple conductor wire in order to maximise the conductor surface. This is preferred because the brief transient nature of the discharge current creates high frequency current components which flow mostly along the surface of a conductor rather than through the main bulk of the conductor.

The print head normally contains electronic circuitry which may be damaged by the high voltage present in an electrostatic discharge. Therefore the path from the print head cover to earth is isolated from the electronic circuitry while the path is in the print head and in the conduit, and the conduit carries a separate signal earth conductor between the electronic circuitry and the printer body.

SUMMARY OF THE INVENTION

Aspects of the present invention provide an electrostatic deflection ink jet printer in which at least a part of the print head cover is made of a material having an electrical surface resistivity of no more than $10^{12}$ ohms per square or an electrical volume resistivity of no more than $10^9$ ohm metres and is electrically connected to a cover earth line.

In one aspect, the print head includes electronic circuits, and a signal earth line for electronic circuits in the print head extends from the electronic circuits into and along the umbilical to its far end. The cover earth line may also extend along the umbilical to its far end or may join the signal earth line. The resistance from the surface of the print head cover to any junction between the cover earth line and the signal earth line is at least 16000 times the resistance of the signal earth line from the junction to the far end of the umbilical.

The resistance from the surface of the print head cover to the near end of the umbilical is at least 16000 times the resistance of any length of the cover earth line inside the umbilical. The print head cover may be moulded from an antistatic or static dissipative material. The limit to the resistivity of the material of the print head cover prevents build-up of electric charge on the cover. The ratio of resistances implies that the total resistance for an electrostatic discharge will be sufficient to avoid large electrostatic discharge currents, avoiding the need for an earthing wire braid in the umbilical. The ratio of resistances also prevents an electrostatic discharge to the cover from disrupting the electronic circuits.

In another aspect, the material of the aforesaid at least a part of the print head cover has an electrical surface resistivity of at least $10^5$ ohms per square or an electrical volume resistivity of at least 100 ohm metres, so that the material is antistatic or static dissipative, and the electrical resistance from the surface of the print head cover to the end of the cover earth line remote from the print head cover is at least 1 kΩ. The print head cover may be moulded from the antistatic or static dissipative material. In this aspect, the print head does not necessarily include electronic circuits, and so the umbilical does not necessarily carry a signal earth line. The limit to the resistivity of the material of the print head cover prevents build-up of electric charge on the cover. The minimum resistance limits the current arising from an electrostatic discharge, avoiding the need for an earthing wire braid in the umbilical and avoiding the need for the cover earth line to carry large currents.

According to an aspect of the present invention there is provided an electrostatic deflection ink jet printer comprising a printer body, a print head and a flexible conduit (often known as an umbilical) extending between the printer body and the print head. The printer body comprises electrical components including electronic circuits of a control system and has an electrical ground for the electrical components. Preferably the printer body has an earth conductor to be connected to an external earth, and the electrical ground is connected to the earth conductor. However, the printer body may not have an earth connector e.g. in the case that it is double insulated, in which case the electrical ground will be floating relative to an external earth. The print head has at least one jet-forming orifice, an arrangement of electrodes for trapping charges on ink drops of the ink jet (or jets) and for providing an electric field for deflecting charged ink drops, and electronic circuits. One or more signal data lines extend between the electronic circuits of the print head and the electronic circuits of the printer body via the flexible conduit. A signal earth line extends between the electronic circuits of the print head and the printer body via the flexible conduit, for providing a signal earth potential to the electronic circuits in the print head. The signal earth line is coupled to the electrical ground of the printer body. The print head has a print head cover that is connected to a cover earth line. The cover earth line may join the signal earth line within the print head or the flexible conduit (preferably within the print head) or even within the printer body, or it may extend via the flexible conduit to be electrically connected to the electrical ground of the printer body independently of the signal earth line. At least a part of the print head cover, which part is exposed to a volume containing a part of the ink jet (or ink jets) when in use, is electrically connected to the cover earth line and. is formed of (i) a material having an electrical surface resistivity of up to $10^{12}$ ohms per square (preferably up to $10^{10}$ ohms per square) or (ii) a material having an electrical volume resistivity of up to $10^{9}$ ohm metres (preferably up to $10^{7}$ ohm metres) All of the exposed exterior surface of the print head cover has an electrical resistance (when dry) to an intermediate point that is at least 16 000 (sixteen thousand) times the resistance from the intermediate point to the electrical ground of the printer body. If the cover earth line joins the signal earth line in the print head (or a short distance, e.g. up to 10 cm, into the flexible conduit), the intermediate point is the junction between the cover earth line and the signal earth line. If the cover earth line joins the signal earth line elsewhere, or does not join it at all, the intermediate point is the place on the cover earth line where it enters the flexible conduit (or a short distance, e.g. up to 10 cm, into the flexible conduit).

Another aspect of the invention provides an electrostatic deflection continuous ink jet printer comprising a printer body, a print head and a flexible conduit extending between the printer body and the print head, the print head comprising (a) an ink gun for forming a continuous ink jet, (b) an arrangement of electrodes to trap electric charges on ink drops of the ink jet and to create an electrostatic field to deflect ink drops carrying trapped electric charges, (c) a gutter for receiving ink drops of the ink jet that are not used for printing, (d) electronic circuits and (e) a print head cover that extends over at least a part of a volume in which the ink drops travel in operation of the printer, the print head cover having an exit hole to enable ink drops that are used for printing to exit the said volume, the printer comprising (f) a signal earth line extending from the electronic circuits of the print head via the flexible conduit to an electrical reference location of the printer body, and (g) a cover earth line extending from the print head cover, at least a part of the print head cover having an electrical surface resistivity of no more than $10^{12}$ ohms per square or an electrical volume resistivity of no more than $10^{9}$ ohm metres, the said at least a part of the print head cover surrounding the exit hole and being electrically connected to the cover earth line, and either (i) the cover earth line extending to join the signal earth line at a place on the signal earth line that is either in the print head or is no more than 10 cm into the flexible conduit from the print head, and the electrical resistance Rc from every uncovered place on the external surface of the print head cover to the said place on the signal earth line being at least 16,000 times the electrical resistance from the said place on the signal earth line to the electrical reference location of the printer body, or (ii) the cover earth line extending more than 10 cm into the flexible conduit from the print head and being electrically connected to the electrical reference location of the printer body via the signal earth line or not via the signal earth line, the electrical resistance Rp from every uncovered place on the external surface of the print head cover to a place on the cover earth line that is 10 cm into the flexible conduit being at least 16000 (sixteen thousand) times the electrical resistance from the said place on the cover earth line to the electrical reference location of the printer body.

If there is an electrostatic discharge to the print head cover, it will be discharged to the electrical ground of the printer body via a discharge path comprising (i) the part of the print head cover from the point of discharge to the cover earth line together with the cover earth line itself and (ii) any further component, such as the signal earth line, that connects the cover earth line to the electrical ground of the printer body.

If the cover earth line joins the signal earth line (whether in the print head or elsewhere), the signal earth for the electronic circuits in the print head is connected to this discharge path at the junction between the signal earth line and the cover earth line. Therefore the relative resistances of the two parts of the discharge path, as noted above, provides a potential divider that influences the voltage fluctuation experienced by the ground terminals of the electronic circuits in the print head during an electrostatic discharge. By ensuring that the effective resistance of the print head cover together with the cover earth line is sufficiently greater than the resistance of the part of the signal earth line from its junction with the cover earth line to the electrical ground, the voltage during an electrostatic discharge is almost entirely generated across the print head cover and the cover earth line, and the voltage fluctuation that is conducted to the ground terminals of the electronic circuits in the print head is kept to a level that is unlikely to damage or to disrupt the operation of the electronic circuits or corrupt the data sent or received by the electronic circuits in the print head.

Additionally, if the cover earth line extends into the flexible conduit by more than a minimal distance (about 10 cm in practice) it becomes very difficult to avoid a significant capacitive coupling between the cover earth line and the signal earth line (and also between the cover earth line and signal data lines carrying data signals to and from the electronic circuits in the print head). In this case the relative resistances of the two parts of the discharge path, as noted above, provides a potential divider that influences the voltage fluctuation in the part of the cover earth line that is capacitively coupled to the signal earth line and the signal data lines. By ensuring that the effective resistance of the print head cover together with the part of the cover earth line in the print head is sufficiently greater than the resistance of the part of the cover earth line that is in the flexible conduit and is likely to be capacitively coupled to the signal earth and data lines, the voltage during an electrostatic discharge is almost entirely generated across the print head cover and the part of the cover earth line that is in the print head, and the voltage fluctuation that will be capacitively coupled into the signal earth and data lines during an electrostatic discharge event is kept to a level that is unlikely to damage or to disrupt the operation of the electronic circuits or corrupt the data sent or received by the electronic circuits in the print head.

An electrostatic discharge from a person touching the print head cover or from an electrically charged plastic web can be modelled as a discharge from a capacitance of 100 pF charged to 8 kV through an internal resistance of 150Ω. The internal resistance in the electrostatic discharge model adds to the resistance from the electrostatic discharge location on the print head cover to the cover earth line, and therefore further reduces the voltage fluctuation experienced by the ground terminals of the electronic circuits. Therefore it is safe to ignore this internal resistance in the analysis of the effect of the potential divider.

Accordingly, the potential of 8 kV (eight thousand volts) can be regarded as being divided across the potential divider formed by the two parts of the discharge path mentioned above. Because the resistance of the first part of the discharge path is at least 16000 (sixteen thousand) times the resistance of the second part, the voltage fluctuation at any junction between the cover earth line and the signal earth line and the voltage fluctuation coupled into the signal earth and data lines is limited to no more than 0.5 V. This is within the tolerance of some common types of electrical circuitry, so that it is possible to design the electrical circuitry of the print head such that it will not normally be disrupted by such a voltage fluctuation. Additionally, the potential divider implies that the resistance between the external surface of the print head cover and the printer body is sufficiently high that dangerous currents cannot flow between them. Consequently, it is possible to use the signal earth line to connect the print head cover to ground and it is no longer necessary to provide a metal braid or a high-current earth conductor in the flexible conduit in order to earth the print head cover. Even if a separate earth connection is used for the print head cover, i.e. the cover earth line connects to the printer body earth independently of the signal earth line, this connection need only be a simple low-current line such as a thin copper wire, and it is not necessary to provide a metal braid or a high-current earth conductor in the flexible conduit in order to earth the print head cover. This allows the flexible conduit to be manufactured more cheaply and also allows it to be more flexible since the metal braid is comparatively stiff.

Preferably the cover earth line joins the signal earth line within the print head, or less preferably a short distance into the flexible conduit, so that it is not necessary to provide a separate cover earth line along the flexible conduit.

Preferably the minimum electrical resistance from any part on the exposed exterior surface of the print head cover to the junction between the cover earth line and the signal earth line is at least 16 kΩ. This allows the resistance from the junction between the cover earth line and the signal earth line to the electrical ground of the printer body to be up to 1Ω, which should normally be achievable in the design of an electrostatic deflection continuous ink jet printer. The peak current generated by an electrostatic discharge of 8 kV would be 0.5 A in this case.

More preferably, the minimum electrical resistance from any part on the exposed exterior surface of the print head cover to the junction between the cover earth line and the signal earth line is at least 80 kΩ. This allows the resistance from the junction between the cover earth line and the signal earth line to the electrical ground of the printer body to be up to 5Ω. This should be achievable with a normal signal earth wire (e.g. a copper electrical wire of 0.5 mm to 1 mm diameter) in the flexible conduit even if the flexible conductor is 6 m or more long. The peak current generated by an electrostatic discharge of 8 kV would be 0.1 A in this case.

The minimum electrical resistance from any part on the exposed exterior surface of the print head cover to the junction between the cover earth line and the signal earth line may be at least 500 kΩ (0.5 MΩ). This allows this resistance to be much more than 16 000 (sixteen thousand) times the resistance from the said junction to the electrical ground of the printer body. For example, it would be 500 000 (five hundred thousand) times if the resistance from the junction between the cover earth line and the signal earth line to the electrical ground of the printer body is 1Ω. The peak current generated by an electrostatic discharge of 8 kV would be no more than 0.02 A. This means that the voltage fluctuation at the junction between the signal earth line and the cover earth line, and therefore the voltage fluctuation at the ground for the electronic circuits in the print head, would be no more than 0.02 V.

The significance of transient effects can be assessed by considering the time constant of the electrostatic discharge. This time constant will depend on the inductance of the discharge path. This inductance is primarily caused by the inductance of wire used as the signal earth. A typical signal earth wire might have an inductance of about 1 pH per metre. Therefore, a very long 8-metre conduit (umbilical), with an inductance of 1 pH per metre, can be regarded as a worst case example. This would result in an inductance of 8 pH in the discharge path. If the electrostatic discharge path has a resistance of 16 kΩ and an inductance of 8 pH, its time constant (calculated as L/R) will be 0.5 nanoseconds, or 500 picoseconds. This is substantially faster than the typical response time of the electronic circuits in the print head. Therefore even in this worst case, any transient voltage spike at the signal earth for the electronic circuits in the print head, arising from the inductance of the signal earth line, can be ignored as being too brief to disrupt the electronic circuits in the print head. For shorter conduits with less inductance in the signal earth line, and for greater resistances in the discharge path, the time constant will be even shorter.

In practice, it may often be easy to provide a signal earth line with a lower resistance than 1Ω. For example, 2 metres of copper wire having a diameter of 1 mm may have a resistance of about 1/25 Ω(0.04Ω). Thus it may be practical to provide a lower electrical resistance from any part on the exposed exterior surface of the print head cover to the junction between the cover earth line and the signal earth line, for example of at least 1 kΩ. This would still be 16000 times the resistance from the junction between the cover earth line and the signal earth line to the electrical ground of the printer body provided that this resistance is no more than 1/16 Ω, which can be provided reasonably easily. In this case, the time constant of the electrostatic discharge path will typically be 8 nanoseconds or less. However, this is less preferred because the discharge current could be as high as 8 A.

If the electronic circuits in the print head have a faster response time than has been assumed in the analysis given above, the time constant of the electrostatic discharge can be shortened appropriately by increasing the resistance from any part on the exposed exterior surface of the print head cover to the junction between the cover earth line and the signal earth line. Assuming a long umbilical with an inductance of 8 pH in the discharge path, a resistance of 80 kΩ would provide a time constant of 100 picoseconds, and a resistance of 500 kΩ would provide a time constant of 16 picoseconds.

The above discussion of resistances, currents and time constants apply in an analogous manner to the case where the cover earth line extends for a significant distance along the flexible conduit and is capacitively coupled to the signal earth and data lines. In this case, the calculations show the currents that will be carried by the cover earth line and the voltages (and time constants thereof) that may be coupled into the signal earth and data lines.

In another aspect of the present invention there is provided an electrostatic deflection continuous ink jet printer comprising a printer body, a print head and a flexible conduit extending between the printer body and the print head, the print head comprising (a) an ink gun for forming a continuous ink jet, (b) an arrangement of electrodes to trap electric charges on ink drops of the ink jet and to create an electrostatic field to deflect ink drops carrying trapped electric charges, (c) a gutter for receiving ink drops of the ink jet that are not used for printing and (d) a print head cover that extends over at least a part of a volume in which the ink drops travel in operation of the printer, the print head cover having an exit hole to enable ink drops that are used for printing to exit the said volume, the printer comprising (e) a cover earth line extending from the print head cover via the flexible conduit to an electrical reference location of the printer body, at least a part of the print head cover having an electrical surface resistivity of at least $10^5$ ohms per square and no more than $10^{12}$ ohms per square or an electrical volume resistivity of at least 100 ohm metres and no more than $10^9$ ohm metres, the said at least a part of the print head cover surrounding the exit hole and being electrically connected to the cover earth line, and the electrical resistance Re from every uncovered place on the external surface of the print head cover to the electrical reference location being at least 100 ohm.

Preferably the electrical resistance Re is provided by the material of the print head cover.

In this aspect, the print head may not include electronic circuits, in which case it is not necessary to consider the effect of an electrostatic discharge on a signal earth line. However, by making at least a part of the print head cover out of a material having the specified range of resistivity, and ensuring that the resistance from the surface of the print head cover to the electrical reference location is at least a minimum value, it is possible to limit the current of an electrostatic discharge event so that there is no need to provide a metal braid or a high-current earth conductor in the flexible conduit in order to earth the print head cover. In the standard electrostatic discharge model discussed above, the electrostatic charge is considered to be at 8 kV and the electrostatic discharge source is considered to have an internal resistance of 150 ohm. Accordingly, an electrical resistance Re of 100Ω, combined with the electrostatic discharge internal resistance of 150Ω will generate a peak current of up to 32 A (the peak current may be less if there is a significant inductance as well). The discharge current flows only for a short time so that this current can be carried by a normal copper wire without overheating.

The total charge discharged from a human body in an electrostatic discharge event is sufficiently small that any significant current flows very briefly. However, if the resistance of the discharge path is small the brief transient current may be high, and this can generate a significant transient voltage at locations in the printer body that are coupled to the current flow, such as the chassis of the printer body. Such a transient voltage may disrupt the operation of various printer components. The resistance Re limits the magnitude of the transient current and so reduces the degree of disruption to the operation of the printer during an electrostatic discharge event, even if the electrostatic discharge source does not have any significant internal resistance.

Although a value of 100Ω for Re provides some protection, the current limiting effect will be greater, creating less disturbance to the printer operation and making its performance more predictable, if the value of Re is greater and therefore a value of at least 1 kΩ is preferred. This would limit the peak current from an electrostatic discharge of 8 kV to 8 A. Still higher values of Re provide better protection. For example, a resistance Re of at least 8 kΩ would limit the peak current to no more than 1 A. If for example this current flows to earth through the printer chassis, and the connection through the chassis has a resistance of 1Ω, this will result in a voltage change at the chassis of 1 V. It is reasonably straightforward to protect other components from the influence of a voltage fluctuation of this magnitude. Preferably the resistance Re is at least 80 kΩ, so that the peak current is no more than 0.1 A. More preferably the resistance Re is at least 800 kΩ, so that the peak current is no more than 10 mA. This ensures that any voltage fluctuation at the printer body will be very small and would be unlikely to result in any noticeable disruption to the operation of any components in the printer.

As discussed above with reference to other aspects of the invention, the upper resistivity limit means that the material of the at least a part of the print head cover is not totally insulating, and allows the dissipation of any charge that is deposited on this part of the print head cover such as charge carried by charged microdrops of ink.

According to another aspect of the present invention there is provided a print head assembly for an electrostatic deflection ink jet printer, the print head assembly comprising a print head and a flexible conduit (often known as an umbilical). The print head has a one or more jet-forming orifices, an arrangement of electrodes for trapping charges on ink drops of the ink jet (or ink jets) and for providing an electric field for deflecting charged ink drops, and electronic circuits. One or more signal data lines extend from the electronic circuits of the print head along the flexible conduit to one or more signal data connectors. A signal earth line, for providing a signal earth potential to the electronic circuits in the print head, extends from the electronic circuits of the print head along the flexible conduit to a signal earth connector. The flexible conduit can be coupled to a printer body so as to extend between the printer body and the print head, so that the signal data lines are coupled to electronic circuits of the printer body via the signal data connectors and the signal earth line is coupled to an electrical ground of the printer body via the signal earth connector.

The print head has a print head cover that is connected to a cover earth line. The cover earth line may join the signal earth line within the print head or the flexible conduit (preferably within the print head) or it may extend via the flexible conduit to a cover earth connector. At least a part of the print head cover that is exposed to a volume containing a part of the ink jet (or jets) when in use is electrically connected to the cover earth line and is formed of (i) a material having an electrical surface resistivity of up to $10^{12}$ ohms per square (preferably up to $10^{10}$ ohms per square) or (ii) a material having an electrical volume resistivity of up to $10^9$ ohm metres (preferably up to $10^7$ ohm metres). All of the exposed exterior surface of the print head cover has an electrical resistance (when dry) to an intermediate point that is at least 16 000 (sixteen thousand) times the resistance from the intermediate point to the relevant earth connector. If the cover earth line joins the signal earth line in the print head (or a short distance, e.g. up to 10 cm, into the flexible conduit), the intermediate point is the junction between the cover earth line and the signal earth line and the relevant earth connector is the signal earth connector. If the cover earth line joins the signal earth line elsewhere, the intermediate point is the place on the cover earth line where it enters the flexible conduit (or a short distance, e.g. up to 10 cm, into the flexible conduit), and the relevant earth connector is the signal earth connector. If the cover earth line does not join the signal earth line at all, the intermediate point is the place on the cover earth line where it enters the flexible conduit (or a short distance, e.g. up to 10 cm, into the flexible conduit) and the relevant earth connector is the cover earth connector.

A further aspect of the present invention provides a print head assembly for an electrostatic deflection continuous ink jet printer, the print head assembly comprising a print head and a flexible conduit attached to and extending away from the print head, the print head comprising (a) an ink gun for forming a continuous ink jet, (b) an arrangement of electrodes to trap electric charges on ink drops of the ink jet and to create an electrostatic field to deflect ink drops carrying trapped electric charges, (c) a gutter for receiving ink drops of the ink jet that are not used for printing, (d) electronic circuits and (e) a print head cover that extends over at least a part of a volume in which the ink drops travel in operation of the printer, the print head cover having an exit hole to enable ink drops that are used for printing to exit the said volume, the print head assembly comprising (f) a signal earth line extending from the electronic circuits of the print head to and along the flexible conduit to a signal earth electrical connector remote from the print head, and (g) a cover earth line extending from the print head cover, at least a part of the print head cover having an electrical surface resistivity of no more than $10^{12}$ ohms per square or an electrical volume resistivity of no more than $10^9$ ohm metres, the said at least a part of the print head cover surrounding the exit hole and being electrically connected to the cover earth line, and either (i) the cover earth line extending to join the signal earth line at a place on the signal earth line that is either in the print head or is no more than 10 cm into the flexible conduit from the print head, and the electrical resistance Rc from every uncovered place on the external surface of the print head cover to the said point on the signal earth line being at least 16,000 times the electrical resistance from the said point on the signal earth line to the signal earth electrical connector, or (ii) the cover earth line extending more than 10 cm into the flexible conduit from the print head to join the signal earth line at a place on the signal earth line within the flexible conduit, and the electrical resistance Rp from every uncovered place on the external surface of the print head cover to a place on the cover earth line that is 10 cm into the flexible conduit being at least 16000 (sixteen thousand) times the electrical resistance from the said place on the cover earth line to the signal earth electrical connector, or (iii) the cover earth line extending more than 10 cm into the flexible conduit from the print head and extending along the flexible conduit to a cover earth electrical connector remote from the print head, the electrical resistance Rp from every uncovered place on the external surface of the print head cover to a place on the cover earth line that is 10 cm into the flexible conduit being at least 16000 (sixteen thousand) times the electrical resistance from the said place on the cover earth line to the cover earth electrical connector.

A further aspect of the present invention provides a print head assembly for an electrostatic deflection continuous ink jet printer, the print head assembly comprising a print head and a flexible conduit attached to and extending away from the print head, the print head comprising (a) an ink gun for forming a continuous ink jet, (b) an arrangement of electrodes to trap electric charges on ink drops of the ink jet and to create an electrostatic field to deflect ink drops carrying trapped electric charges, (c) a gutter for receiving ink drops of the ink jet that are not used for printing and (d) a print head cover that extends over at least a part of a volume in which the ink drops travel in operation of the printer, the print head cover having an exit hole to enable ink drops that are used for printing to exit the said volume, the print head assembly comprising (e) a cover earth line extending from the print head cover to and along the flexible conduit to a cover earth electrical connector remote from the print head, at least a part of the print head cover having an electrical surface resistivity of at least $10^5$ ohms per square and no more than $10^{12}$ ohms per square or an electrical volume resistivity of at least 100 ohm metres and no more than $10^9$ ohm metres, the said at least a part of the print head cover surrounding the exit hole and being electrically connected to the cover earth line, and the electrical resistance Re from every uncovered place on the external surface of the print head cover to the cover earth electrical connector being at least 100 ohm.

Normally a printer body will provide a very low resistance path from a signal earth connector to an electrical ground, and a very low resistance path from a cover earth connector (if present) to an electrical ground, when a print head assembly is coupled to the printer body. Therefore the resistance from the signal earth connector or the cover earth connector to the electrical ground can be ignored and the discussion and analysis given above, and the preferred and optional values given above, can also be applied to the print head assembly with the resistance to the signal earth connector or the cover earth connector being considered in place of the resistance to the electrical reference location (ground) of the printer body.

The print head cover is typically removable to allow access, e.g. for cleaning. It may extend over substantially all of the print head except where the print head joins the umbilical (flexible conduit) or it may extend over only part of the print head.

In a printing operation of the printer, a continuous jet of ink drops is formed. Usually, the drops are deflected in flight so that only some drops are used for printing. Drops of ink that are not required for printing are caught by a gutter and are normally returned to an ink tank within the body of the printer. Typically the ink includes a solvent which is normally highly volatile so that the drops of ink dry quickly after printing. The solvent also tends to evaporate from the ink that is caught in the gutter and returned to the ink tank, so that the ink used by the printer loses solvent over time. In order to maintain the correct ink viscosity, additional solvent may be added from time to time. Additionally, the ink is slowly used up as the printer prints and therefore the ink in the ink tank may also be replenished from time to time.

The jet-forming orifice on the print head is normally provided in an ink gun. The arrangement of electrodes normally comprises a charge electrode for trapping electric charges on drops of ink and deflection electrodes for creating an electrostatic field for deflecting charged drops of ink. The flexible conduit (umbilical) will normally carry fluid lines, for example for providing pressurised ink to the ink gun and for applying suction to the gutter and transporting ink from the gutter back to the printer body, and electrical lines, for example to provide a drive signal to a piezoelectric crystal or the like for imposing pressure vibrations on the ink jet, to provide electrical connections for the charge electrode and the deflection electrodes, and to provide drive currents for any valves that may be included in the print head.

The print head may be arranged to form a single ink jet, or it be arranged to form two or more ink jets. For example, there may be two or more ink guns. Alternatively, there may be an ink gun that is arranged to provide more than one ink jet.

In the aspects and embodiments of the invention mentioned above, at least a part of the print head cover is formed of (i) a material having a surface resistivity of up to $10^{12}$ ohms per square (preferably up to $10^{10}$ ohms per square) or (ii) a material having a volume resistivity of up to $10^{9}$ ohm metres (preferably up to $10^{7}$ ohm metres) and is electrically connected to the cover earth line. Accordingly the material is not completely electrically insulating. This helps to allow the dissipation of any electric charges that reach the print head cover, such as from small drops of ink that may arise within the volume enclosed by the print head cover or from splashback from printed drops. Preferably this part of the print head cover includes an exit hole that allows ink drops to leave the volume enclosed by the print head cover for printing. This will normally be at the end of the print head nearest the gutter. This is the part of the print head cover that is most likely to receive small charged drops of ink, both as splashback and from within the volume enclosed by the print head cover.

Preferably the part of the print head cover is formed (e.g. moulded) from a material with a surface resistivity of at least $10^{5}$ ohms per square, or a volume resistivity of at least 100 ohm metres. Such a material can be regarded as anti-static or static dissipative and has a greater resistivity than a conductive material, and therefore it is possible for the material of the print head to provide at least a part of the resistance from the exposed exterior surface of the print head cover to the junction between the cover earth line and the signal earth line. The material may be a mouldable polymer or resin.

Preferably the resistance from the external surface of the print head cover to the junction between the cover earth line and the signal earth line or to the place on the cover earth line that is 10 cm into the flexible conduit, or to the electrical reference location or the cover earth electrical connector, is provided substantially entirely by the material of the print head cover. However, this is not essential and it is possible for example to provide a resistor in the cover earth line. It is possible for part or all of the print head cover to be metal, or another conductive material, in which case a resistor in the cover earth line may be needed in order to provide the minimum resistance from the external surface of the print head cover. It is possible for part of the print head cover to be metal and another part, between the metal part and the cover earth line, to be non-metallic in order to provide the desired resistance, but this is not preferred because it will normally be more complex and expensive to manufacture.

If necessary, there may be an electrically insulating layer on the external surface of the print head cover at least at a region that covers or is adjacent to a connection between the print head cover and the cover earth line. Such an insulating layer can help to ensure that there is the necessary minimum resistance from the external surface of the print head cover to the junction between the cover earth line and the signal earth line or to the place on the cover earth line that is 10 cm into the flexible conduit, or to the electrical reference location or the cover earth electrical connector, by preventing a very short electrical flow path from the external surface of the print head cover to the cover earth line.

Further aspects of the invention and optional features are set out in the accompanying claims.

Surface resistivity may be measured in accordance with IEC 62631-3-2:2015. Volume resistivity may be measured in accordance with IEC 62631-3-1:2016.

The resistance from the exposed exterior surface of the print head to any other location may be measured by covering the exposed exterior surface with a metal foil making good electrical contact with the surface, and then using a conventional ohmmeter to measure the resistance from the metal foil to the other location.

Embodiments of the present invention, given by way of non-limiting example, will be described as reference to the following drawings.

BRIEF DESCRIPTION OF THE DRAWINGS

FIG. 1 shows an ink jet printer embodying the present invention.

FIG. 2 is a schematic top view of the main components in the print head of the printer of FIG. 1.

FIG. 3 is a schematic side view of the main components in the print head of the printer of FIG. 1.

DETAILED DESCRIPTION OF EMBODIMENTS

Figure 4:
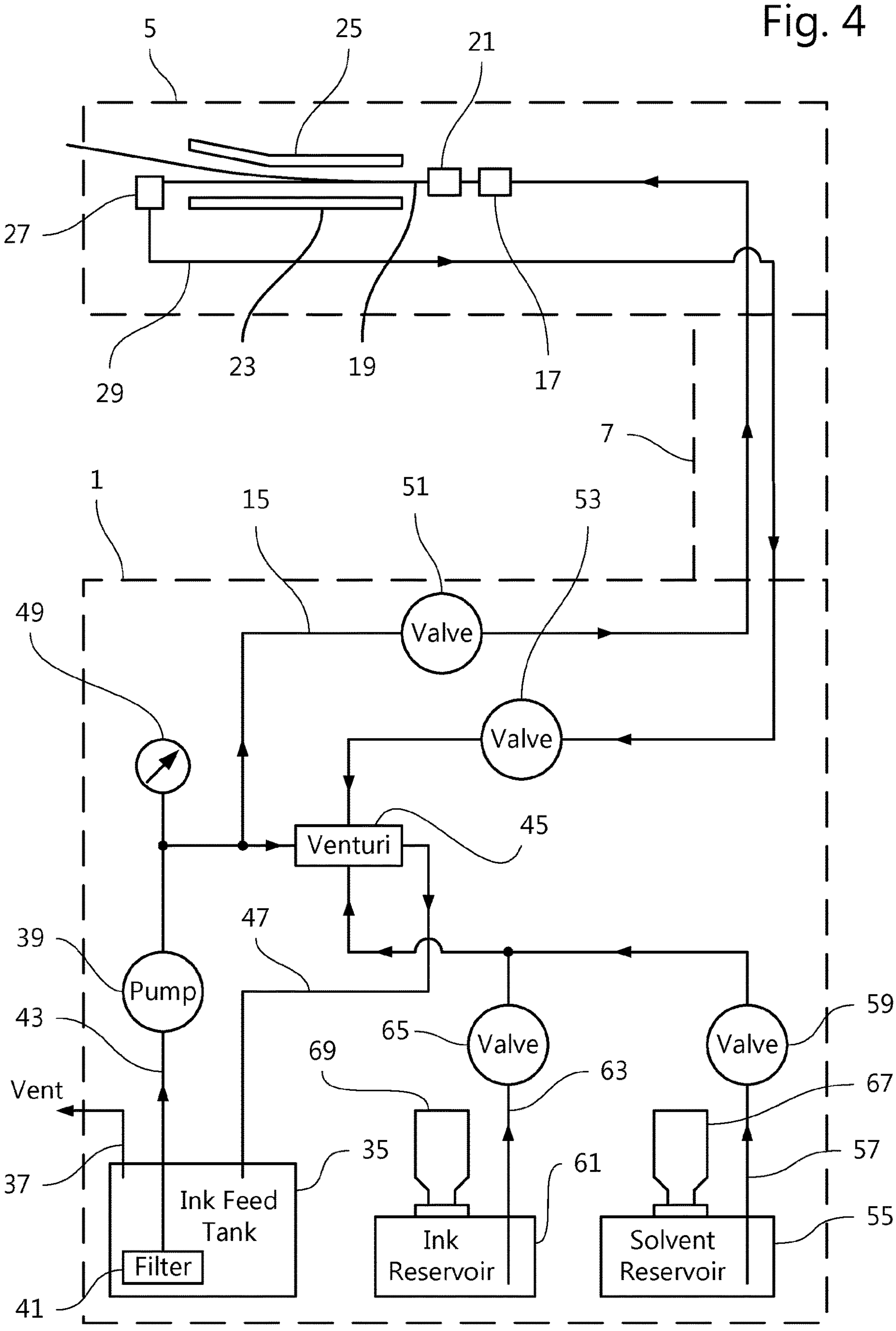
FIG. 4 shows simplified schematic diagram of the fluid system of the printer of FIG. 1.

FIG. 1 shows an electrostatic deflection type continuous ink jet printer. The printer forms a continuous jet of ink and has an arrangement of electrodes for charging drops of ink and deflecting the drops electrostatically in order to print a desired pattern. The main fluid and electrical components are housed within a printer body 1. An operator communicates with the printer via a touchscreen display 3. The ink jet is formed within a print head 5, which also includes the electrode arrangement for charging and deflecting the ink drops, and the print head 5 is connected to the printer body 1 by a flexible connection 7 known as a conduit or an umbilical. Drops of ink, deflected as necessary to create the desired pattern, travel from the print head 5 and strike the surface 9 of an object 11 conveyed past the print head 5, in order to print the desired pattern on the surface 9 of the object 11. The print head 5 and the umbilical 7 form a print head assembly that may be disconnectable from the printer body 1.

The printer is typically an industrial ink jet printer and is suitable to be used with a conveyor 13 that conveys objects 11 past the print head to be printed onto. This is in contrast to a document printer that prints onto flat sheets, and which normally conveys the sheets itself rather than being used with a conveyor 13 that is external to the printer. The object 11 may be a manufactured product item, such as a bottle or can of drink, a jar of jam, a ready meal, or a carton containing multiple individual items. The desired pattern may comprise product information such a batch number or a “use by” date. The printer may print onto the object 11 from the side so that the ink jet travels in a direction generally across the conveyor, or from above so that the ink jet travels in a direction generally towards the conveyor, or from any other angle. For example, bottles are normally printed onto from the side whereas ready meals are normally printed onto from above. In FIG. 1 the printer is set up to print from the side and partially above.

FIG. 2 is a schematic top view and FIG. 3 is a schematic side view of the main components of the print head 5 in the region of the ink jet. The terms “top view” and “side view” represent conventional directions from which to view the print head on the assumption that the printer will print onto an object 11 from the side, and do not necessarily correspond to the orientation of the print head when in use. Pressurised ink, delivered from the printer body 1 through the umbilical 7, is provided via an ink feed line 15 to an ink gun (or nozzle) 17. The pressure of the ink drives it out of the ink gun 17 through a small jet-forming orifice to form an ink jet 19. Provided that pressurised ink is received by the ink gun 17 and any valves in the ink gun 17 are in the appropriate state, the ink jet 19 is formed continuously. Accordingly, this type of ink jet printer is known as a continuous ink jet printer, by contrast with a drop-on-demand printer in which a drop of ink is ejected only when a dot is to be printed.

Although the ink jet 19 leaves the ink gun 17 as a continuous unbroken stream of ink, it rapidly breaks into separate drops. The path of the ink jet passes through a slot in a charge electrode 21, which is positioned so that the ink jet 19 separates into drops while it is in the slot through the charge electrode 21. Other arrangements and other shapes of charge electrode 21 are possible, so long as the ink jet 19 is subject to the electric field of the charge electrode at the position where it separates into drops. The ink is electrically conductive and the ink gun 17 is held at a constant voltage (typically ground). Accordingly, any voltage applied to the charge electrode 21 induces a charge into the part of the ink jet 19 that is subject to the electric field in the slot of the charge electrode 21. As the ink jet 19 separates into drops, any such charge is trapped on the drops. Accordingly, the amount of charge trapped on each drop can be controlled by the voltage on the charge electrode 21 and different amounts of charge can be trapped on different drops by changing the voltage on the charge electrode 21.

The ink jet 19 then passes between two deflection electrodes 23, 25. A large potential difference (typically several kilovolts) is applied between the deflection electrodes 23, 25 to provide a strong electric field between them. Accordingly, the drops of ink are deflected by the electric field and the amount of deflection depends on the amount of charge trapped on each drop. In this way, each ink drop can be steered into a selected path. As shown in FIG. 2, uncharged ink drops, which pass through the electric field without deflection, travel to a gutter 27 where they are caught. Suction is applied to the inside of the gutter 27 by a gutter suction line 29, and so the ink received by the gutter 27 is sucked away and returned through the umbilical 7 to the printer body 1, for re-use.

Drops of ink that are deflected by the field between the deflection electrodes 23, 25, so as to miss the gutter 27, leave the print head 5 and form printed dots on the surface 9 of the object 11.

The ink gun 17, the charge electrode 21, the deflection electrodes 23, 25 and the gutter 27 are mounted on a baseboard 31. The gutter suction line 29 extends beneath the baseboard 31. It may also be convenient to route the electrical connections for the charge electrode 21 and the deflection electrodes 23, 25 beneath the baseboard 31, as shown in FIG. 3. The print head 5 also contains electronic circuits (not shown in FIGS. 2 and 3), which may be positioned beneath the baseboard 31. The deflection electrodes 23, 25 may be mounted so that they each extend perpendicular to the plane of the baseboard 31. Alternatively they may extend parallel to the plane of the baseboard, as shown in FIGS. 2 and 3, with one deflection electrode 23 lying on the baseboard 31 and the other deflection electrode 25 being spaced above the baseboard 31 and supported by one or more electrode supports 33. Normally the deflection electrode 23 lying on the baseboard will be connected to ground and the deflection electrode 25 spaced above the baseboard 31 will be connected to a high voltage supply to create the deflection field. The electrical connection for the deflection electrode 25 spaced above the baseboard 31 may be carried in one of the electrode supports 33.

FIG. 4 is a simplified schematic diagram of a fluid system for the ink jet printer of FIG. 1. Ink is held in an ink feed tank 35 in the printer body 1. The ink feed tank 35 is the main ink tank of the printer. The interior of the ink feed tank 35 is held at atmospheric pressure by a vent 37. Ink is sucked out of the ink feed tank 35 by a pump 39, via a filter 41 and an ink supply line 43. The ink, pressurised by the pump 39, flows through a Venturi 45 and back to the ink feed tank 35 via an ink return line 47. A pressure transducer (pressure sensor) 49 is used to sense the ink pressure on the outlet side of the ink pump 39.

The ink feed line 15 is also connected to the outlet side of the ink pump 39 and receives pressurised ink. Thus the ink feed line 15 provides an ink feed path to supply pressurised ink from the ink pump 39 to the ink gun 17. An ink feed valve 51 controls the flow of ink along the ink feed line 15. The pump 39 can drive ink continuously through the Venturi 45 and back to the ink feed tank 35, even when the ink feed valve 51 prevents ink from flowing along the ink feed line 15. The flow of ink through the Venturi 45 generates suction and accordingly the Venturi acts as a suction source. The gutter suction line 29 is connected to a suction inlet of the Venturi 45 to receive suction which sucks ink from the gutter 27 through the umbilical 7 back to the printer body 1. The ink from the gutter suction line 29 is sucked into the Venturi 45 and returns to the ink feed tank 35. Fluid flow in the gutter suction line 29 is controlled by a gutter valve 53.

Spare solvent is held in a solvent reservoir 55 which receives suction from the Venturi 45 through a solvent top-up line 57. If solvent needs to be added to the ink in the ink feed tank 35 to dilute the ink and correct its viscosity, a solvent top-up valve 59 in the solvent top-up line 57 is opened briefly. This allows the Venturi 45 to suck a small quantity of solvent from the solvent reservoir 55 into the ink flow through the Venturi 45. The solvent sucked into the Venturi 45 then passes into the ink feed tank 35 to dilute the ink.

Spare ink is held in an ink reservoir 61 which receives suction from the Venturi 45 through an ink top-up line 63. When the level of ink in the ink feed tank 35 becomes low, an ink top-up valve 65 in the ink top-up line 63 is opened. Ink is sucked out of the ink reservoir 61 by the Venturi 45 and is delivered to the ink feed tank 35 in a similar manner to the operation for topping up with solvent from the solvent reservoir 55.

The solvent reservoir 55 and the ink reservoir 61 are supplied from a solvent container 67 and an ink container 69 respectively, and the operator replaces the containers 67, 69 as necessary. In practice, it is not always necessary to provide the solvent reservoir 55 and the ink reservoir 61, and the respective top-up lines 57, 63 may be connected directly to the containers 67, 69.

Figure 5:
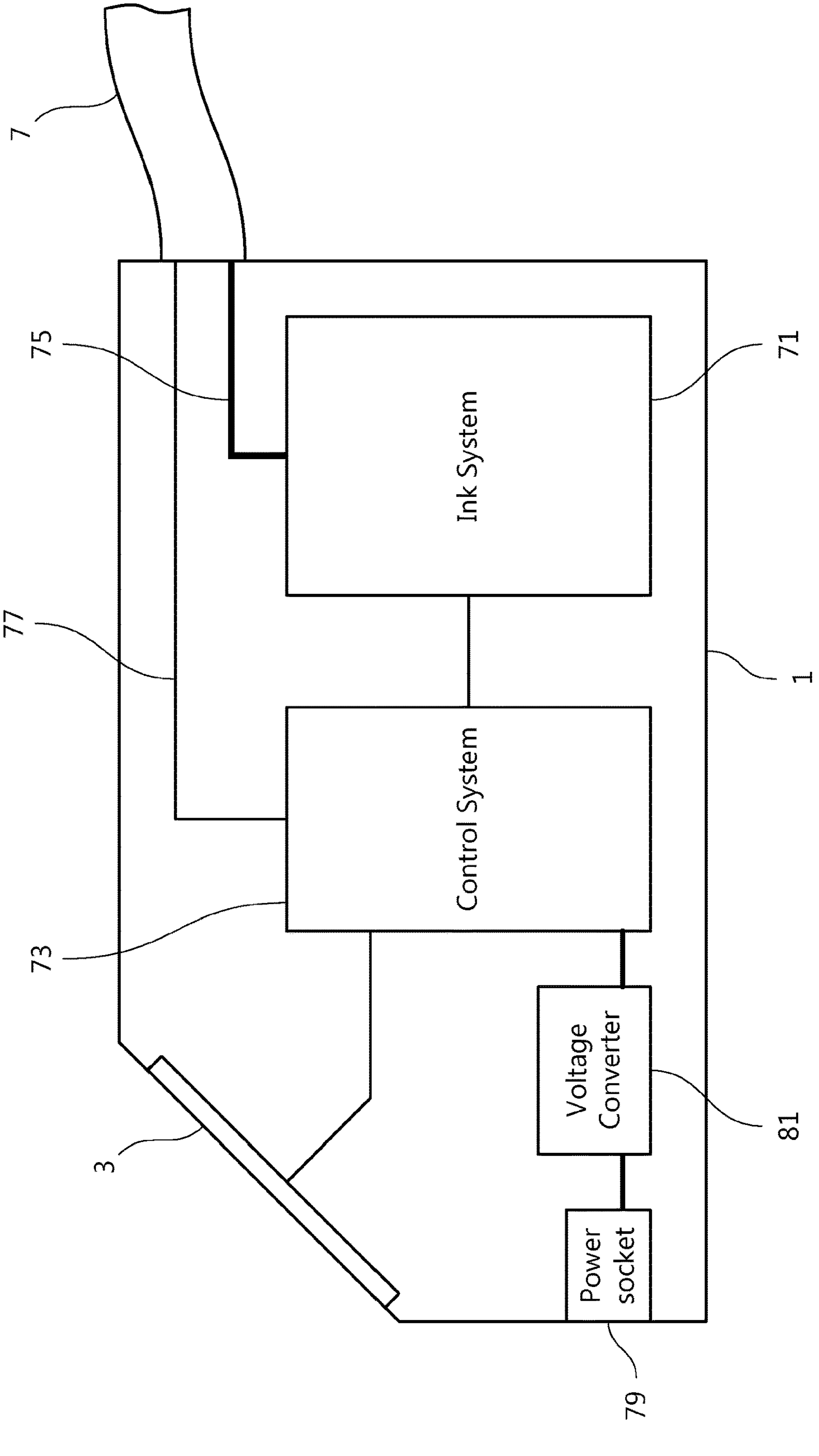
FIG. 5 shows schematically the main components inside the printer body of the printer of FIG. 1.

FIG. 5 shows schematically some of the components inside the printer body 1 of the printer. The printer has a printer body ink system 71, which includes the components in FIG. 4 that are shown inside the printer body 1. The printer body ink system 71 and other parts of the printer operate under the control of a control system 73 that comprises electronic circuits. The control system 73, for example, sends drive currents to the ink pump 39 and to the various valves, 51, 53, 59, 65 of the printer body ink system 71. The control system 73 receives outputs from the pressure sensor 49 and also from level sensors in the ink feed tank 35, the solvent reservoir 55 and the ink reservoir 61. The electronics in the control system 73 communicates with the electronics in the print head 5 via the umbilical 7. The control system 73 also provides outputs to, and receives inputs from, the touchscreen display 3. Typically, the control system will include a processor such as a microprocessor and other electronic components as is well known in the art.

Fluid lines 75 connect the printer body ink system 71 to the print head 5 through the umbilical 7. These fluid lines will include the ink feed line 15, and the gutter suction line 29 shown in FIG. 4. Electrical lines 77 connect the control system 73 to the print head 5 via the umbilical 7. These electrical lines include signal lines for communication between the electronics of the control system 73 and the electronics in the print head 5 and also lines for applying the appropriate voltages to the charge electrode 21 and the deflection of electrodes 23, 25, and for applying a drive signal to a piezoelectric crystal inside the ink gun 17 that applies a vibration to the ink that forms the ink jet 19 in order to control the manner in which it breaks into drops.

The printer receives electric power at a power socket 79, which is converted in a voltage converter 81 to the various voltages required internally within the printer. For example, the printer may be designed to receive 24 volt DC at the power socket 79, since power supplies for generating 24 volts DC from an electric mains supply are widely available. The voltage converter 81 uses the received 24 volt supply to generate the voltages required to power the electronics in the control system 73, which may for example be 5 volts. It also supplies power to a component, either in or controlled by the control system 73, to generate the voltages (e.g. up to about 300 V) applied to the charge electrode 21, the EHT voltage (e.g. about 4 kV) applied to the upper deflection electrode 23 and to generate the drive signal for the piezoelectric crystal inside the ink gun 17.

The power socket 79 also provides a connection to an external electrical earth. This is used to earth the external case of the printer body 1. The earth connection is also provided to the voltage converter 81, which uses it to provide an earth to any components that need an earth. The control system 73 uses the earth received from the voltage converter 81 to provide an electrical ground for the electronic circuits in the control system 73 and to provide an electrical ground for connection to the signal earth line in the umbilical 7 so as to provide a signal earth to the electronic circuits in the print head 5.

Figure 6:
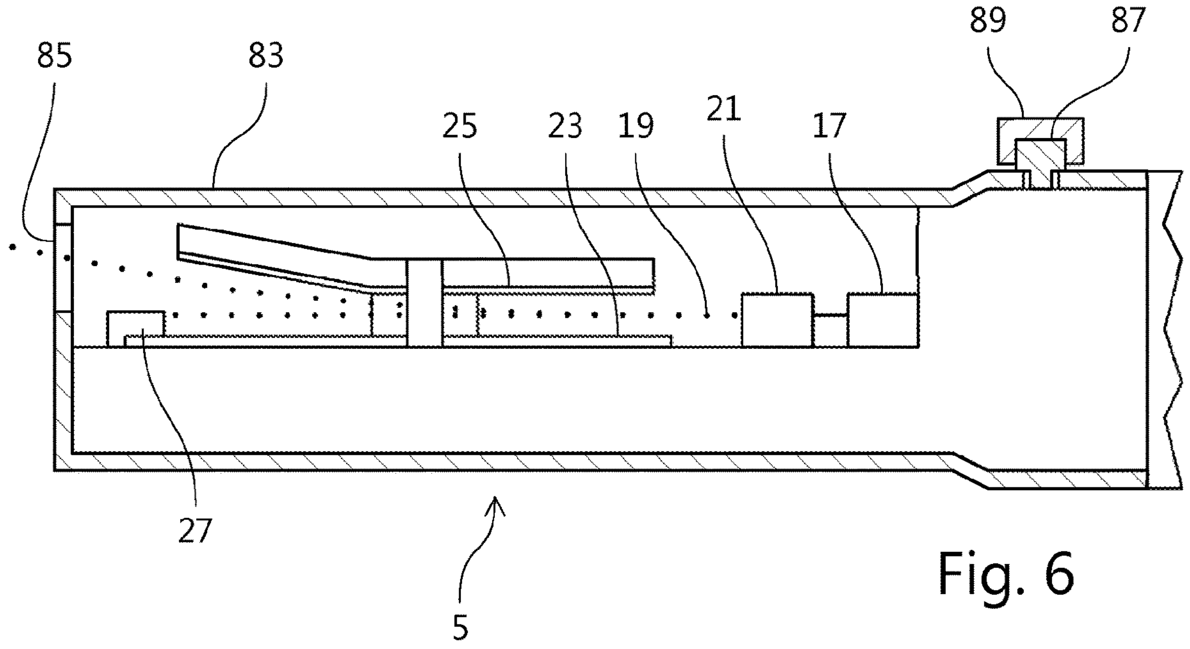
FIG. 6 shows a side view of part of the print head of the printer of FIG. 1 with a first design of print head cover in section.
Figure 7:
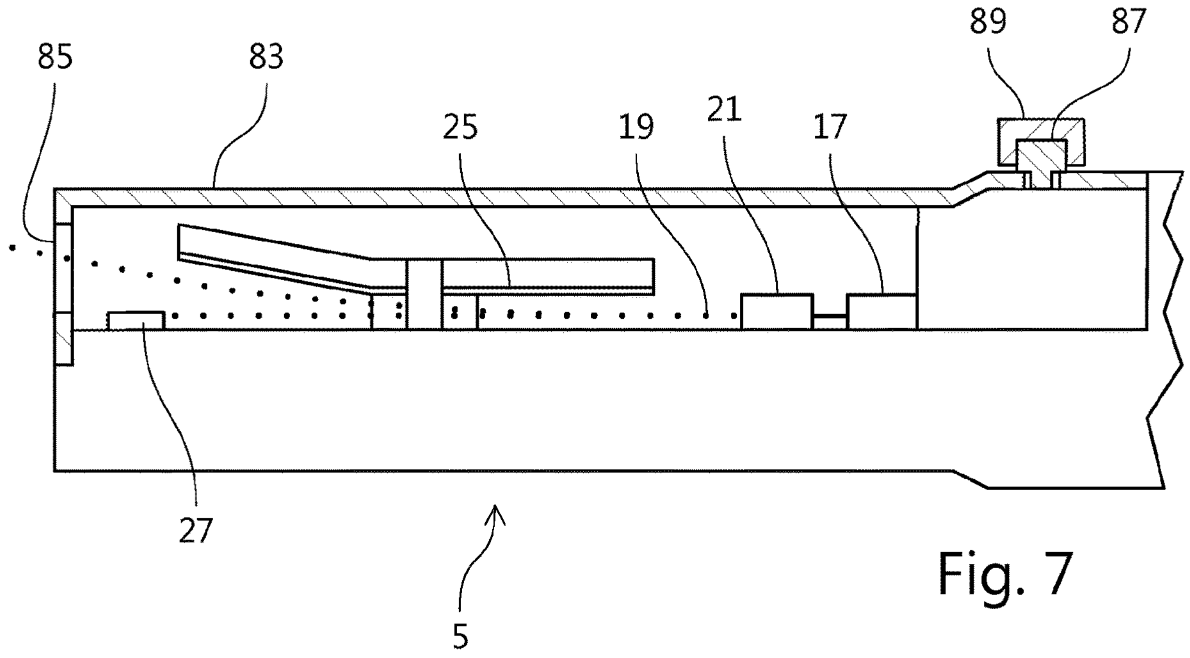
FIG. 7 shows a side view of part of the print head of the printer of FIG. 1 with a second design of print head cover in section.

FIGS. 6 and 7 are side views of the part of the print head 5 where the ink jet 19 is present. A removable print head cover 83 is shown in section. The cover 83 ensures that the full length of the ink jet 19 from the ink gun 17 to the gutter 27 is enclosed while the printer is in use, but removal of the cover allows access to the space where the ink jet 19 is formed in order to enable inspection or cleaning.

In the embodiment of FIG. 6 the cover 83 is generally cylindrical and fully encloses the corresponding part of the print head 5. In the embodiment of FIG. 7 the cover 83 is generally semi-cylindrical, and covers the upper half of the corresponding part of the print head. In FIG. 7 the external surface of the print head 5 is exposed at the lower half of the print head. Many other designs of cover 83 are possible. In both FIG. 6 and FIG. 7 the downstream (with respect to the direction of travel of the ink jet 19) end of the cover 83 is closed but has an exit hole 85 to allow ink drops used for printing to exit from inside the cover.

In both FIG. 6 and FIG. 7, the cover 83 is secured to the rest of the print head by a cover retaining screw 87. The retaining screw 87 is metal, and its exposed end is covered by an insulating handle 89. The handle allows an operator to turn the screw, to release or fasten the cover 83, by hand. Other fastening arrangements are possible. However, the retaining screw 87 is convenient because it also ensures that the cover 83 makes a good contact with an electrical earth connection, as discussed below with reference to FIGS. 8 and 9.

The print head cover 83 is made of an anti-static or static dissipative material. An anti-static material can be regarded as a material having an electrical surface resistivity in the range of $10^{10}$ to $10^{12}$ ohms per square or an electrical bulk resistivity in the range of $10^7$ to $10^9$ ohm metres and a static dissipative material can be regarded as a material having a surface resistivity in the range of $10^5$ to $10^{10}$ ohms per square or a bulk resistivity in the range of 100 to $10^7$ ohm metres. Preferably the material of the print head cover 83 is a plastic or other mouldable material.

In the operation of the printer, the drops of ink in the ink jet 19 either pass into the gutter 27 or pass out of the print head through the hole 85 in order to print dots on the surface 9 of the object 11. Therefore no ink drops should come into contact with the print head cover 83. However, microdrops (which are much smaller than the drops of ink in the ink jet) can also occur while the ink jet 19 is running. Microdrops may be formed as the ink jet 19 breaks into drops at the charge electrode 21 or from the impact of drops on a contact surface inside the gutter 27. They may also be formed outside the print head cover 83 from the impact of drops on the surface 9 that is being printed onto.

It is likely that some of the microdrops will carry an electric charge. Any charged microdrops that hit one of the deflection electrodes 23, 25 will discharge their charge to the electrode, and the charge will be dissipated by the electrical connection to the electrode. Any microdrops in the space enclosed by the print head cover 83 that miss the deflection electrodes 23, 25 will tend to hit the print head cover 83 in the vicinity of the exit hole 85. Microdrops formed outside the print head cover may also hit the print head cover 83, again in the vicinity of the exit hole 85. Accordingly the print head cover 83 may receive electric charges from the microdrops. If the print head cover 83 was insulated, these electric charges could accumulate on the print head cover 83 and create an electric field that would interfere with the correct deflection of the ink drops. This is avoided because the print head cover 83 is made of an anti-static or static dissipative material as stated above, and is electrically earthed.

Figure 8:
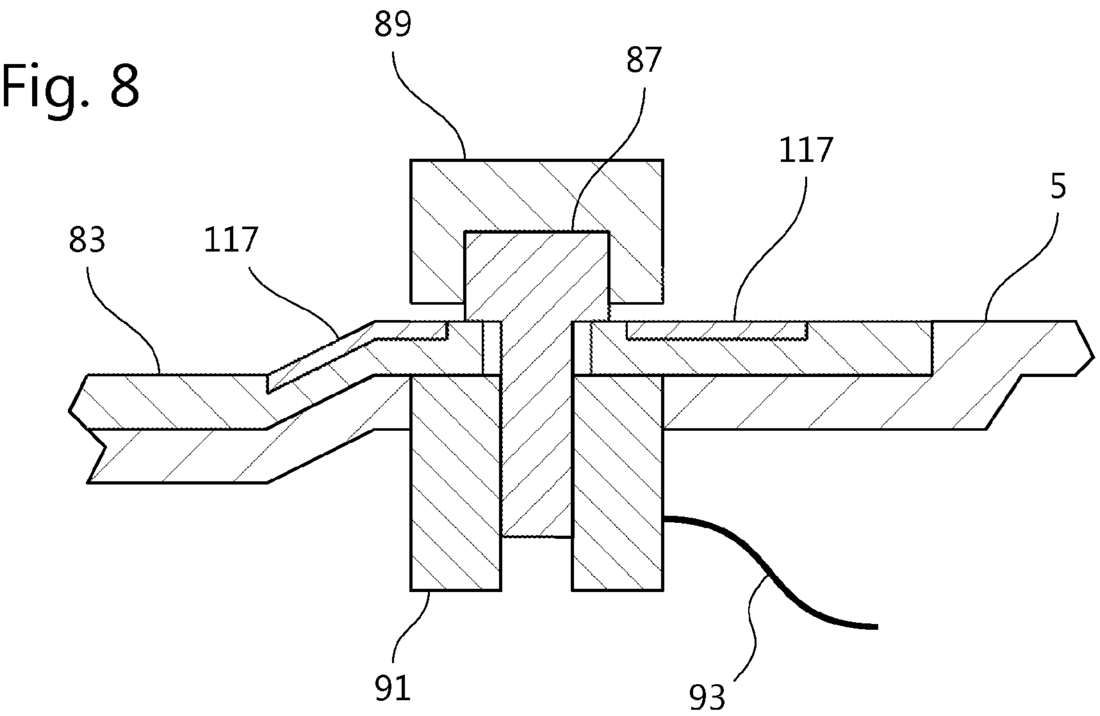
FIG. 8 shows a first arrangement for making an earth connection to the print head cover.

FIG. 8 shows an arrangement for earthing the print head cover 83. The print head cover 83 is fastened to the body of the print head 5 by the retaining screw 87, which passes though the print head cover 83 and engages with a threaded block 91 mounted in the body of the print head 5. The retaining screw 87 and the threaded block 91 are both metal, and therefore electrically conductive, and the threaded block 91 is connected to a cover earth line 93 for earthing the print head cover 83. As mentioned above, there are electronic circuits in the print head 5 and a signal earth line extends from the electronic circuits in the print head along the umbilical 7 so as to provide a signal earth via the printer body 1. The cover earth line 93 is connected to the signal earth line within the print head 5 and thereby provides an earth connection for the print head cover 83 via the signal earth line.

When the retaining screw 87 is tightened, it presses the print head cover 83 against the retaining block 91 and so the print head cover makes a good connection to the retaining block 91 both by direct contact and via the retaining screw 87. In this way, any electric charges that arrive at the print head cover 83 will flow slowly through the material of the print head cover 83 or over the surface of the print head cover 83 to reach the retaining screw 87 and the threaded block 91, and will then be earthed via the cover earth line 93 and the signal earth line. Accordingly, electric charges do not accumulate on the print head cover 83.

Figure 9:
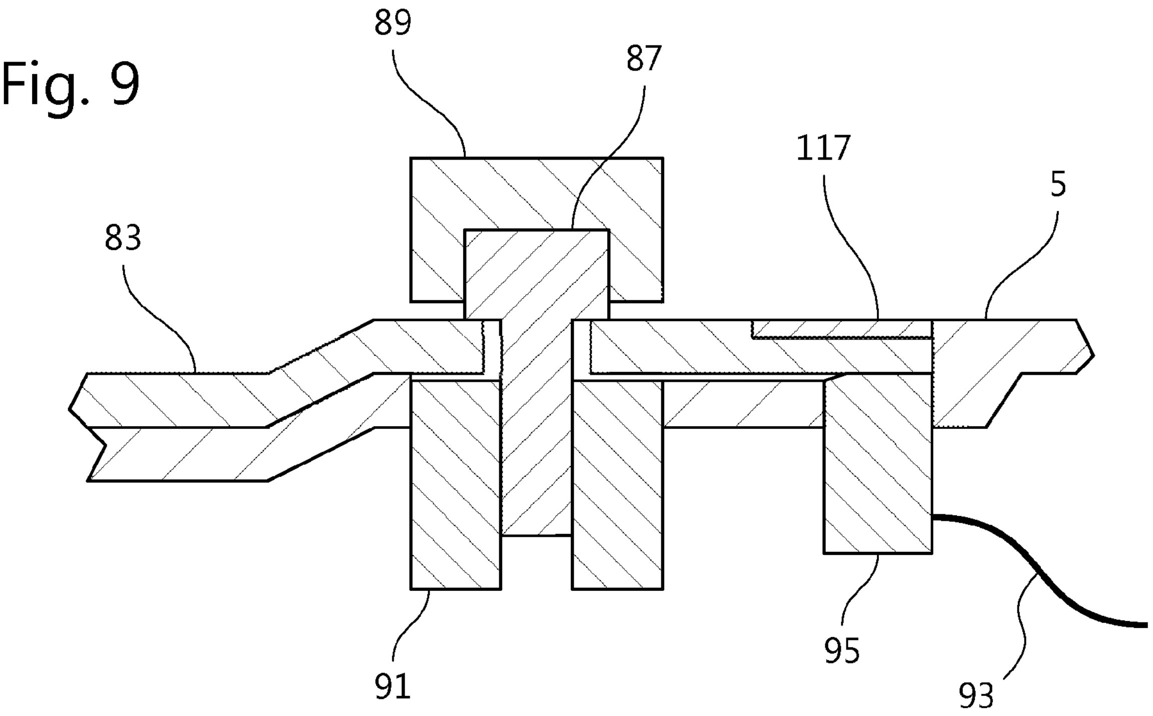
FIG. 9 shows a second arrangement for making an earth connection to the print head cover.

FIG. 9 shows an alternative arrangement in which the print head cover is not earthed via the cover retaining screw 87 and the threaded block 91. Instead, the print head cover 83 contacts a separate metal earthing block 95 that is fitted into the body of the print head 5.

In this arrangement, the cover earth line 93 is connected to the earthing block 95. As shown in FIG. 9, the earthing block extends outwards slightly further than the adjacent surface of the body of the print head 5, to ensure that the print head cover 83 makes a good contact with the earthing block 95.

The print head cover 83 may also receive an electrostatic discharge. This may occur for example if the print head cover 83 is touched by a nearby person who carries an electrostatic charge. It may also occur if the printer is being used to print onto a continuous plastic web that may become charged as it unwinds from a reel. An electrostatic discharge to the print head cover 83 results in a sudden large voltage arising at the print head cover 83. Since the print head cover 83 is electrically connected to the signal earth line by the cover earth line 93, there is a possibility that the operation of the electronic circuits in the print head may be disrupted, or the circuits themselves may even be damaged, by a sudden large voltage appearing on the signal earth line. This is avoided by ensuring that there is adequate electrical resistance between the place on the print head cover 83 that receives the electrostatic discharge and the place where the cover earth line 93 joins the signal earth line.

Figure 10:
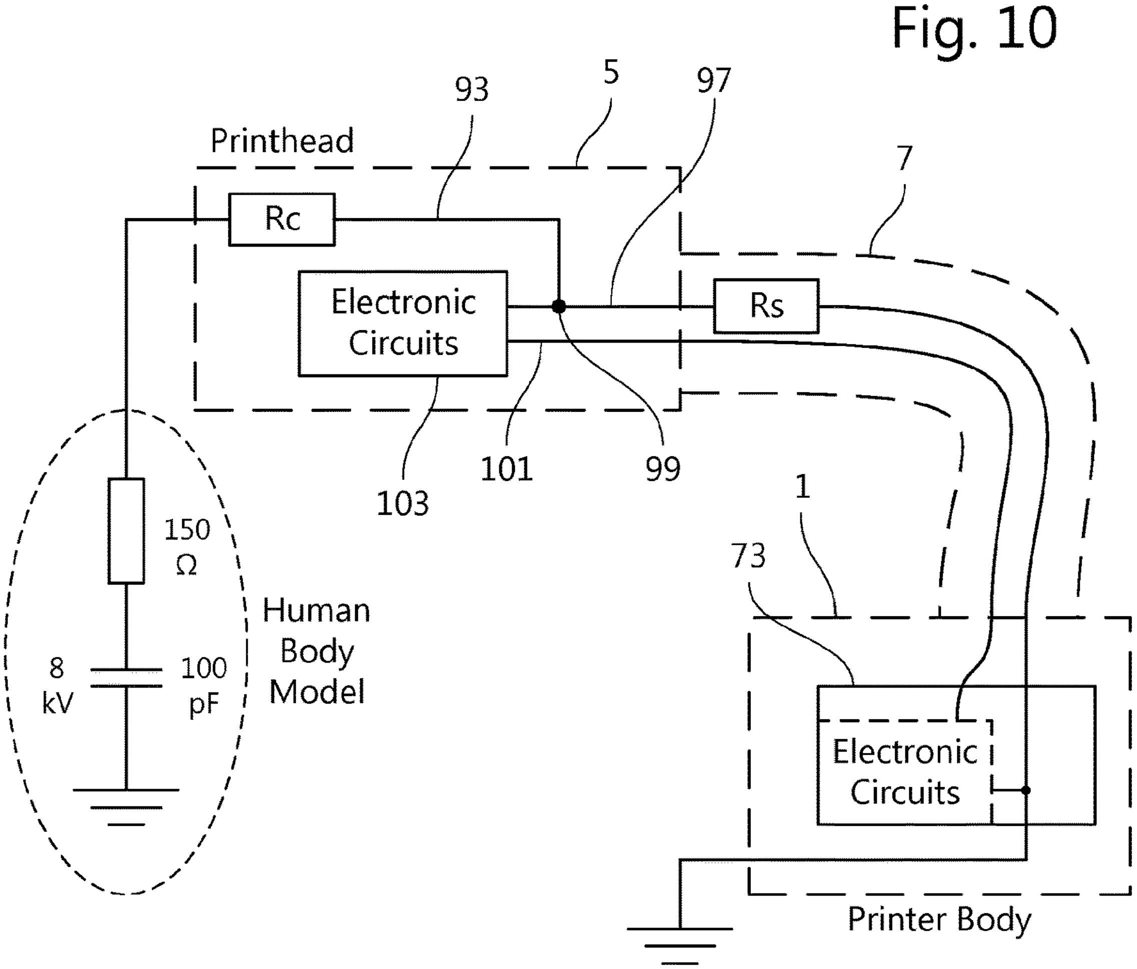
FIG. 10 shows a schematic circuit for modelling the effect of an electrostatic discharge to the print head cover in the printer of FIG. 1.

The electric circuit for modelling the effect of an electrostatic discharge is shown in FIG. 10. The source of the electrostatic discharge is represented by a human body model for electrostatic discharge. This is based on JEDEC standard JS-001. In FIG. 10, the human body is modelled as a 100 pF capacitor charged to 8 kV and connected for discharge through a 150Ω resistance. As shown in FIG. 10, the cover earth line 93 is connected inside the print head 5 to the signal earth line 97 at a junction 99. The signal earth line 97, together with multiple print head signal data lines 101, extends from the electronic circuits 103 in the print head 5 along the umbilical 7 to the printer body 1.

Figure 11:
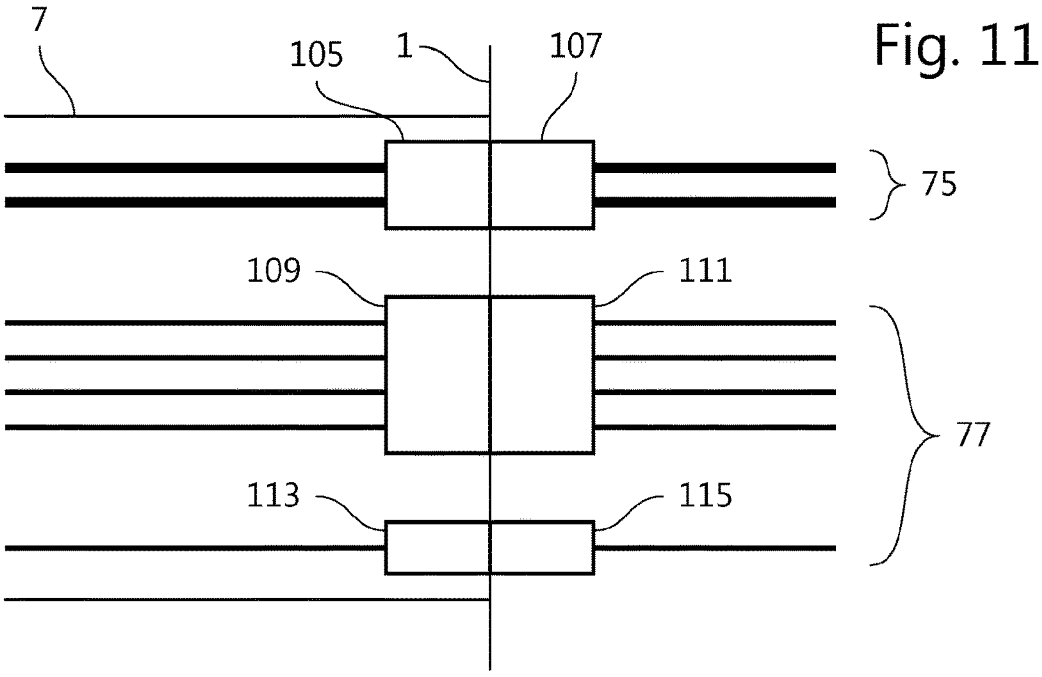
FIG. 11 shows schematically the fluid and electrical connectors at the junction between the umbilical and the printer body in the printer of FIG. 1.

The print head 5 and the umbilical 7 jointly form a print head assembly that 7 can be disconnected from the printer body 1, e.g. to allow a different print head assembly to be fitted so as to change the type of print head 5 or change the length of the umbilical 7. As shown schematically in FIG. 11, where the umbilical 7 meets the printer body 1 an umbilical fluid line connector 105 mates with a printer body fluid line connector 107, an umbilical electrical connector 109 mates with a printer body electrical connector 111 and an umbilical HT connector 113 mates with a printer body HT connector 115. The fluid line connectors 105, 107 make connections between the umbilical 7 and the printer body 1 for fluid lines 75 such as the ink feed line 15 and the gutter suction line 29. The electrical connectors 109, 111 make connections between the umbilical 7 and the printer body 1 for electrical lines 77. The electrical lines 77 include the signal earth line 97, the print head signal data lines 101 and lines carrying other signals such as the drive signal to a piezoelectric transducer in the ink gun 17 that imposes pressure vibrations on the ink as it forms the ink jet and the drive signal for the charge electrode 21. Accordingly, the umbilical electrical connector 109 comprises a signal earth line umbilical connector and signal data line umbilical connectors, and the printer body electrical connector 111 comprises a signal earth line printer body connector and signal data line printer body connectors, amongst other connectors. The electrical line carrying the high voltage to be applied to the deflection electrode 25 is connected using the separate HT connectors 113, 115.

As shown in FIG. 10, the signal earth line 97 and the print head signal data lines 101 are connected in the printer body 1 to the control system 73. Electronic circuits in the control system 73 communicate with the electronic circuits 103 in the print head 5 via the print head signal data lines 101. The control system 73 provides an earth connection for the signal earth line 97 via the voltage converter 81 to the power socket 79. The power connection to the power socket 79 provides a connection to an external earth.

The printer body 1 provides a very low resistance connection to earth for the signal earth line 97. Additionally, the length of the signal earth line within the print head 5 is short and provides very little electrical resistance. The electrical resistance between the external earth and the junction 99 (where the cover earth line 93 joins the signal earth line 97) is almost entirely provided by the resistance of the part of the signal earth line 97 that is in the umbilical 7, as this represents almost all of the length of the signal earth line 97. In FIG. 10, this resistance is represented by resistance Rs. Resistance Rc in FIG. 10 represents the resistance between the place on the print head cover 83 where the electrostatic discharge occurs and the junction 99 where the cover earth line 93 joins the signal earth line 97.

In order to avoid disruption of the operation of the electronic circuits 103 in the print head 5 and to avoid corruption of data communicated between the electronic circuits 103 and the control system 73 in the printer body, the voltage on the signal earth line 97 at the electronic circuits 103 (and therefore the voltage at the junction 99) should not fluctuate by more than 0.5 V during an electrostatic discharge event. The voltage fluctuation at the junction 99 is provided by the voltage divider effect of the resistance Rs and the resistance between the junction 99 and the 100 pF capacitor in the human body model of FIG. 10. In FIG. 10, the electrostatic discharge is modelled as providing an electric potential of 8 kV. Therefore the resistance between the junction 99 and the 100 pF capacitor (i.e. Rc plus 150Ω) must be 16,000 times Rs. If the resistance Rs is 1Ω, the resistance between the junction 99 and the 100 pF capacitor must be at least 16 kΩ. This is much greater than the 150Ω resistance in the human body model, and so in effect this requires Rc to be at least 16 kΩ.

In practice, the resistance Rs will depend on the length of the umbilical 7 as well as the grade of wire used in the umbilical 7 for the signal earth line 97. In practice, if the signal earth line is provided by a copper wire having a diameter of 1 mm and the umbilical is only 0.5 m long, the resistance Rs may be about 0.01Ω and so Rc need only be 160Ω. If the signal earth line is provided by a copper wire having a diameter of 0.5 mm and the umbilical is 8 m long, the resistance Rs may be about 0.6Ω so that resistance Rc should be at least 9,600Ω. Therefore if the resistance Rc is at least 16,000Ω this should be adequate to avoid an undesirable spike in the voltage at the earth connection for the electronic circuits 103 in the print head 5 in all printer designs and all umbilical lengths that are likely to be used under normal circumstances.

It is preferred to provide the resistance Rc by the resistance of the material of the print head cover 83, and to provide the cover earth line 93 as a low resistance wire. In the design of FIG. 8 the cover retaining screw 87 is metal and is in electrical contact with the cover earth line via the threaded block 91. Therefore the screw handle 89 must be electrically insulating or alternatively have sufficient electrical resistance so that at least the minimum desired value for Rc is provided between retaining screw 87 and the hand of an operator touching the screw handle 89.

Additionally, if a person touches the print head cover 83 very close to the retaining screw 87 in the design of FIG. 8 or very close to the position of the earthing block 95 in FIG. 9, the path from the person's hand to the retaining screw 87 or the threaded block 91 in FIG. 8 or the earthing block 95 in FIG. 9 may be only a few millimetres. Depending on the material used for the print head cover 83, this distance may be insufficient to provide the desired minimum value for Rc. In this case, a layer 117 of insulating material as shown in FIGS. 8 and 9 can be provided on the outer surface of the print head cover 83 in the vicinity of the retaining screw 87 or the earthing block 95 in order to ensure that the desired minimum value for Rc is maintained under these circumstances.

Preferably the material of the print head cover has an electrical surface resistivity of at least $10^7$ ohms per square or an electrical volume resistivity of at least $10^4$ ohm metres. This will usually be adequate to provide the desired minimum value for the resistance Rc even if the print head cover is touched as close as possible to the electrical connection to the cover earth wire 93, so that there is no need to provide an insulating layer 117.

Figure 12:
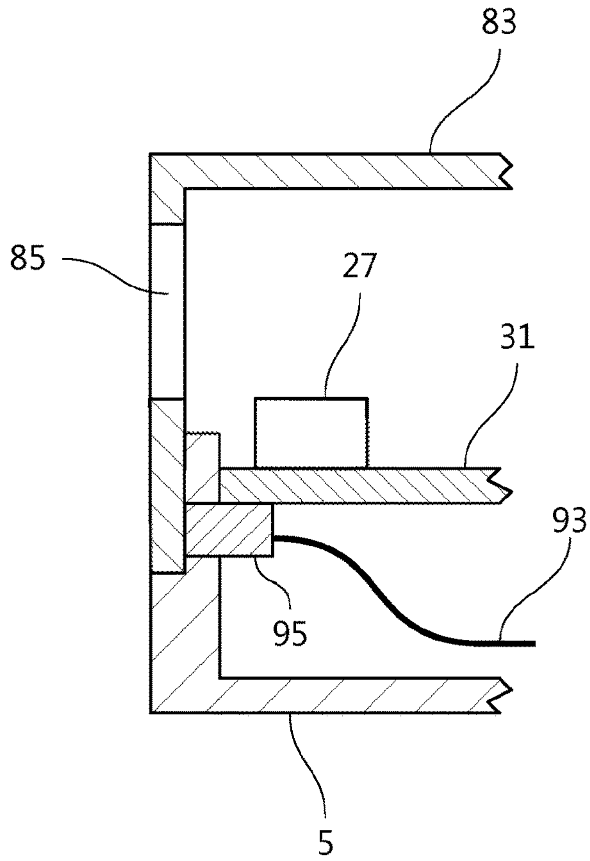
FIG. 12 shows a third arrangement for making an earth connection to the print head cover.

Further embodiments are also possible. For example, it may be more convenient to route the cover earth line 93 below the baseboard 31 in the print head 5 rather than to the arrangements shown in FIGS. 8 and 9. Accordingly, FIG. 12 shows a schematic sectional view of the end part of the print head 5 and the print head cover 83. In this embodiment the earthing block 95 is provided in the end surface of the body of the print head 5, immediately below the baseboard 31. The end surface of the print head cover 83 extends far enough below the level of the baseboard 31 to make contact with earthing block 95. This position for the connection of the print head cover 83 to the cover earth line 93 also provides a shorter (and therefore lower resistance) path to the cover earth line for charges that arrive on the print head cover 83 in the vicinity of the ink jet exit hole 85.

Although it is preferred to make the print head cover from an anti-static or static dissipative material, it is also possible to make all or part of it from an electrically conductive material provided that the path from the conductive material to the cover earth line 93 includes something to provide the required resistance Rc. For example, it would be possible to make part of the print head cover from a conductive material and part from an anti-static or static dissipative material, and to provide the connection to the cover earth line 93 at the part made from an anti-static or static dissipative material. The anti-static or static dissipative part would still provide the necessary resistance Rc between the electrically conductive part and the cover earth line 93.

Figure 13:
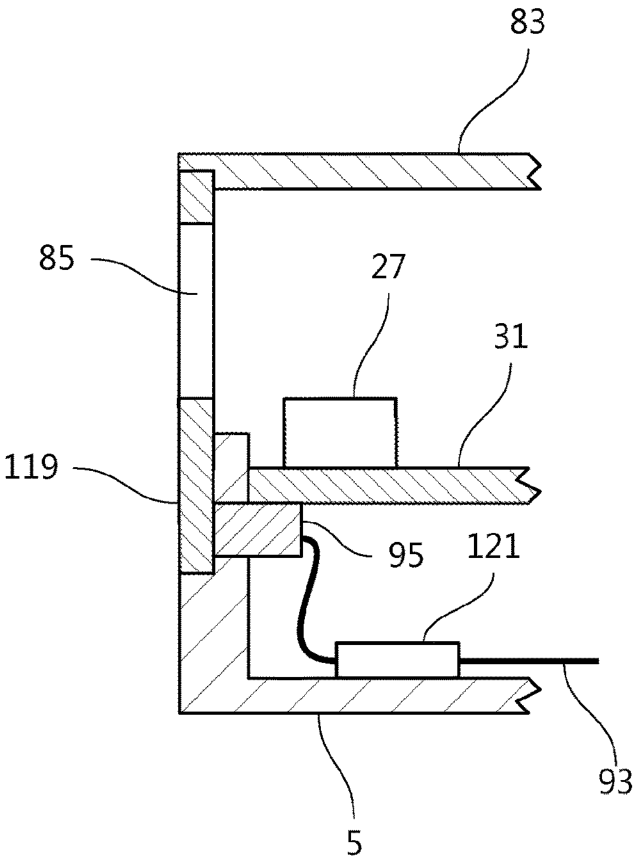
FIG. 13 shows a third design of print head cover with a further arrangement for making an earth connection to the print head cover.

Alternatively an arrangement could be provided such as is shown in FIG. 13. In this case the main part of the print head cover 83 is made of an anti-static or static dissipative material, but an end plate 119 of the print head cover, surrounding the ink jet exit hole 85, is metal and electrically conductive. The connection to the cover earth line 93 is made by an earthing block 95 below the baseboard 31 in the same way as in FIG. 12. Therefore the earthing block 95 contacts the metal end plate 119. There is negligible electrical resistance between the earthing block and all places on the end plate 119. Therefore the required resistance Rc is provided by a resistor 121 in the cover earth line 93.

In the embodiment of FIG. 13 the metal end plate 119 is at the part of the print head cover 83 that receives almost all of the charged microdrops that reach the print head cover 83. Therefore it is possible in this embodiment to make the remainder of the print head cover 83 from an electrically insulating material while still avoiding a substantial build-up of electrical charge on the print head cover 83.

However, the design of the print head cover 83 in FIG. 13 is less preferred than the designs of the print head cover 83 in FIGS. 8, 9 and 12 because it is more complex to manufacture.

The embodiments discussed above enable electrical charge build-up on the print head cover 83 to be avoided and an electrostatic discharge event to be accommodated using the earth connection provided by the signal earth line 97. It is possible with these embodiments to provide sufficient resistance to earth from all points on the print head cover 83 so that a safety earth connection is not required. By comparison, it is known to provide a metal print head cover for an electrostatic deflection continuous ink jet printer, which has a very low resistance safety earth connection to the printer body via the umbilical. Charges from microdrops that strike the print head cover and electrostatic discharge events will also be earthed by the safety earth connection. An electrostatic discharge event will cause high frequency current transients in the safety earth connection, and these will tend to flow over the surface of the earth conductor and not through its bulk. Therefore a wire braid earth connection is usually provided along the length of the umbilical in addition to the safety earth connection, in order to provide a large surface area to carry these current transients. This adds to the cost of the umbilical, makes it more awkward to assemble, and also makes it stiffer and more awkward to handle. In the embodiments discussed above, it is not necessary to use a safety earth or this wire braid because the earth connection is made via the signal earth line 97, and the resistance Rc between the electrostatic discharge event and the signal earth line 97 prevents significant current transients arising in the signal earth line 97. Although the junction 99 between the cover earth line 93 and the signal earth line 97 is preferably in the print head 5, it is possible to place this junction in the umbilical 7 near the end of the umbilical 7 at the print head 5. However it is preferred that the junction 99 should be no further along the umbilical 7 than 10 cm from the end at the print head 5, in order to preserve the benefits provided by joining the cover earth line 93 to the signal earth line 97.

Figure 14:
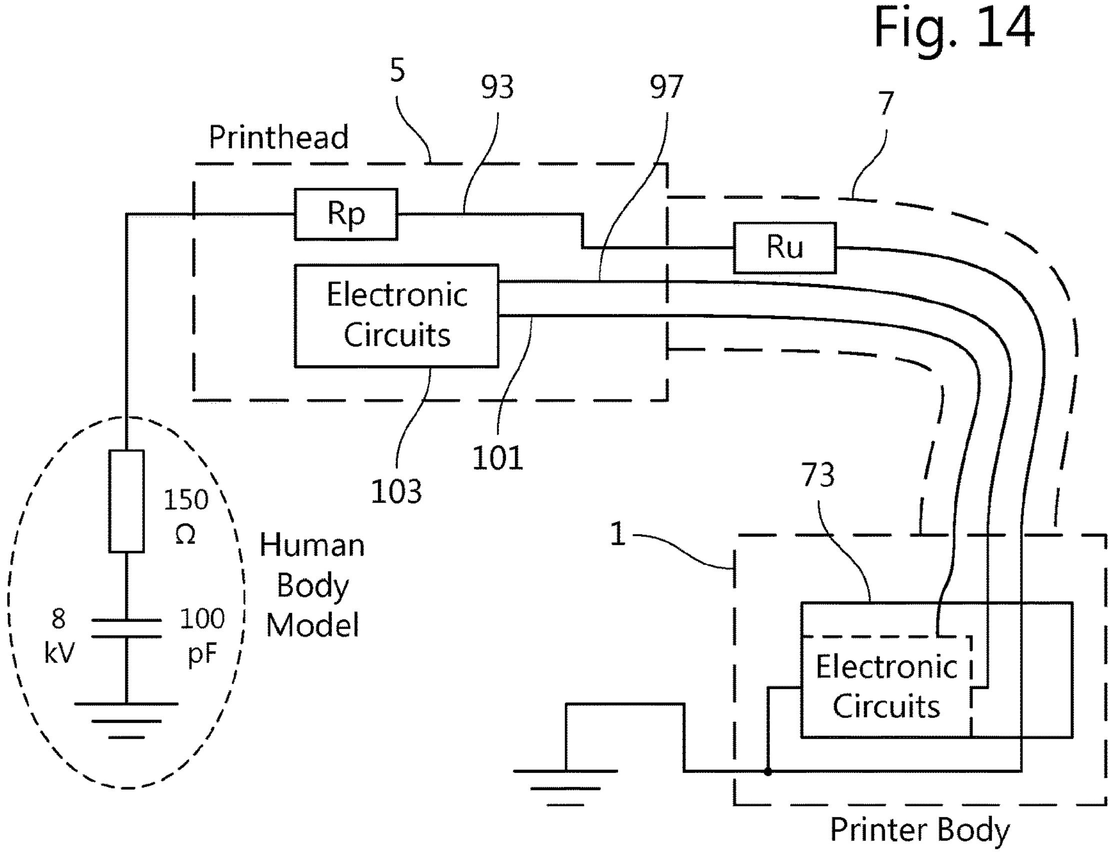
FIG. 14 shows a schematic circuit for modelling the effect of an electrostatic discharge to the print head cover in the case that the cover earth line extends through the flexible conduit to the printer body.

In an alternative embodiment, shown in FIG. 14, the cover earth line 93 does not join the signal earth line 97. Instead, the cover earth line 93 extends along the entire length of the umbilical 7 to the control system 73, and the control system 73 provides an earth connection for the cover earth line 93 via the voltage converter 81 to the power socket 79. The signal earth line 97 is earthed separately via the electronic circuits of the control system 73. In this case, the electrical lines 77 of FIG. 5 include the cover earth line and in FIG. 11 the umbilical electrical connector 109 and the printer body electrical connector 111 comprise respective connectors for the cover earth line 93 as well as connectors for the signal earth line 97.

In this embodiment, an electrostatic discharge to the print head cover 83 is earthed via the cover earth line 93 and is not connected to the signal earth line 97. Therefore the voltage divider of FIG. 10 does not exist in this embodiment. However, the cover earth line 93 extends adjacent to the signal earth line 97 and the signal data lines 101 along the length of the umbilical 7, and there will almost inevitably be a significant capacitive coupling between at least some of the lines. Consequently, if an electrostatic discharge event creates a voltage pulse on the part of the cover earth line 93 in the umbilical 7, this voltage pulse will be capacitively coupled into the signal earth line 97 and/or some of the signal data lines 101. Consequently there remains a possibility that the electronic circuits 103 may be damaged or disrupted or the data on the signal data lines 101 may be corrupted.

In practice it is possible to avoid significant capacitive coupling of the signal earth line 97 and the signal data lines 101 to the first 10 cm of the cover earth line 93 in the umbilical 7, partly because the cover earth line 93 may be held spaced apart from the other lines 97, 101 by the fitting at the end of the umbilical that holds the various lines in the correct positions as they pass into the print head 5, and partly because the degree of capacitive coupling depends on the length of line involved and so the degree of coupling from the first 10 cm is low. Resistance Rp in FIG. 14 represents the electrical resistance between the place on the print head cover 83 where the electrostatic discharge occurs and the place on the cover earth line 93 that is 10 cm into the umbilical 7. The electrical resistance between the external earth and the place on the cover earth line 93 that is 10 cm into the umbilical 7 is almost entirely provided by the resistance from that place on the cover earth line 93 to the end of the umbilical 7 at the printer body 1. In FIG. 14, this resistance is represented by resistance Ru.

As noted above, the voltage on the signal earth line 97 (and on the signal data lines 101) should not fluctuate by more than 0.5 V during an electrostatic discharge event. Therefore the voltage on the part of the cover earth line 93 that is more than 10 cm into the umbilical 7 should not fluctuate by more than 0.5 V. The electrostatic discharge is modelled as providing an electric potential of 8 kV.

The voltage fluctuation at the place on the cover earth line 93 that is 10 cm into the umbilical 7 is provided by the voltage divider effect of the resistance Ru and the resistance between this place and the 100 pF capacitor in the human body model (i.e. Rp plus 150Ω). As discussed with reference to FIG. 10, the contribution of the 150Ω resistance in the human body model can be ignored. Therefore the voltage coupled into the signal earth line 97 and the signal data lines 101 can be limited to no more than 0.5 V if resistance Rp is at least 16,000 times Ru. If the resistance Ru is 1Ω, this requires Rp to be at least 16 kΩ.

The various discussions above concerning the values of Rc and Rs in FIG. 10, and the ratio of their values, can be applied in an analogous manner to Rp and Ru in FIG. 14.

In this embodiment, the cover earth line 93 provides an extra electrical line in the umbilical 7 compared with the embodiment of FIG. 10. However, the value of Rp will be such that the current carried by this line will be low, even during an electrostatic discharge event, and so it can be provided as a simple small-diameter copper wire and it is still unnecessary to provide a metal braid to carry high-frequency current transients or a high-current safety earth.

Figure 15:
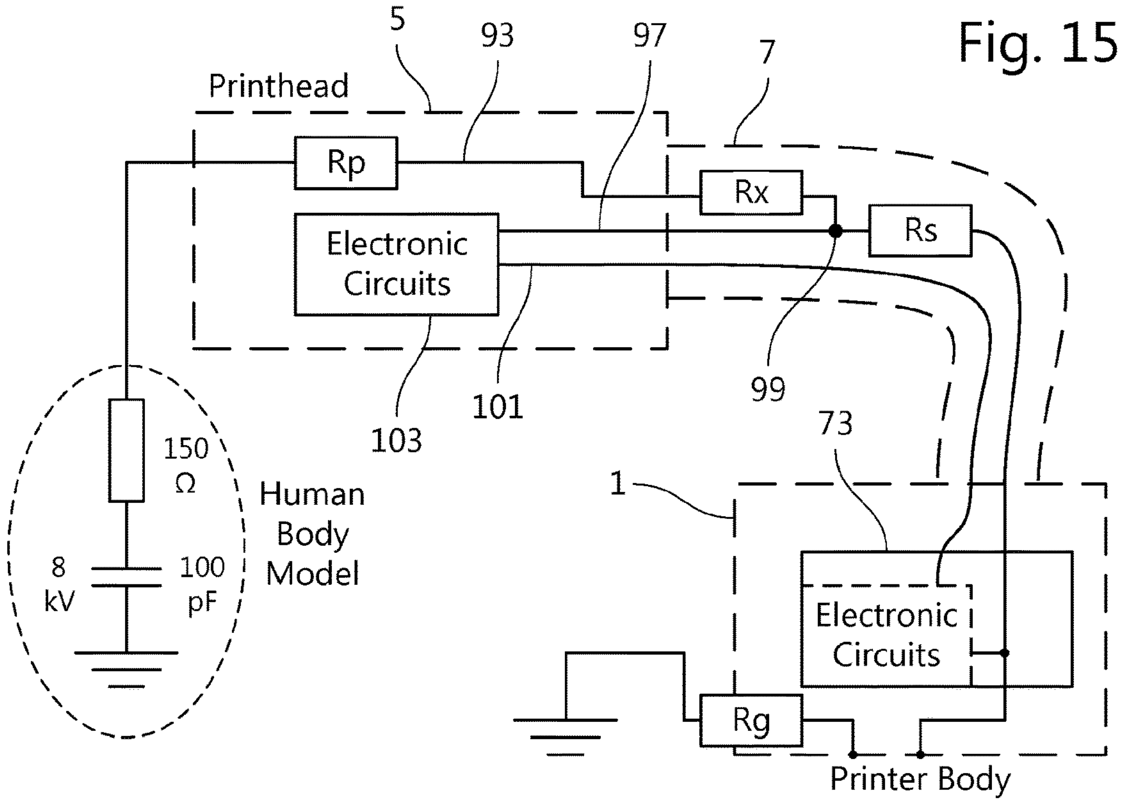
FIG. 15 shows a schematic circuit for modelling the effect of an electrostatic discharge to the print head cover in the case that the cover earth line joins the signal earth line part way along the flexible conduit.

In principle, it would be possible to extend the cover earth line 93 more than 10 cm into the umbilical 7 and then join it to the signal earth line 97, as shown in FIG. 15. In this case, the electrical resistance between the place on the print head cover 83 where the electrostatic discharge occurs and the place on the cover earth line 93 that is 10 cm into the umbilical 7 is resistance Rp as in FIG. 14, and the electrical resistance between the junction 99 (where the cover earth line 93 joins the signal earth line 97) and the end of the umbilical 7 is resistance Rs as in FIG. 10. The resistance from the place on the cover earth line 93 that is 10 cm into the umbilical 7 to the junction 99 is shown as resistance Rx in FIG. 15. If the analysis of FIG. 14 is applied to FIG. 15, Ru of FIG. 14 is provided by Rx plus Rs in FIG. 15. Therefore Rp should be at least 16000 times Rx+Rs.

If the analysis of FIG. 10 is applied to FIG. 15, Rc of FIG. 10 is provided by Rp plus Rx. Since Rp is at least 16000 times Rx+Rs, Rp is more than 16000 times Rs. Therefore Rp plus Rx must be more than 16000 times Rs. Consequently, in FIG. 15 if Rp is at least 16000 times Ru as required by FIG. 14, it is inevitable that Rc is at least 16000 times Rs as required by FIG. 10.

Figure 16:
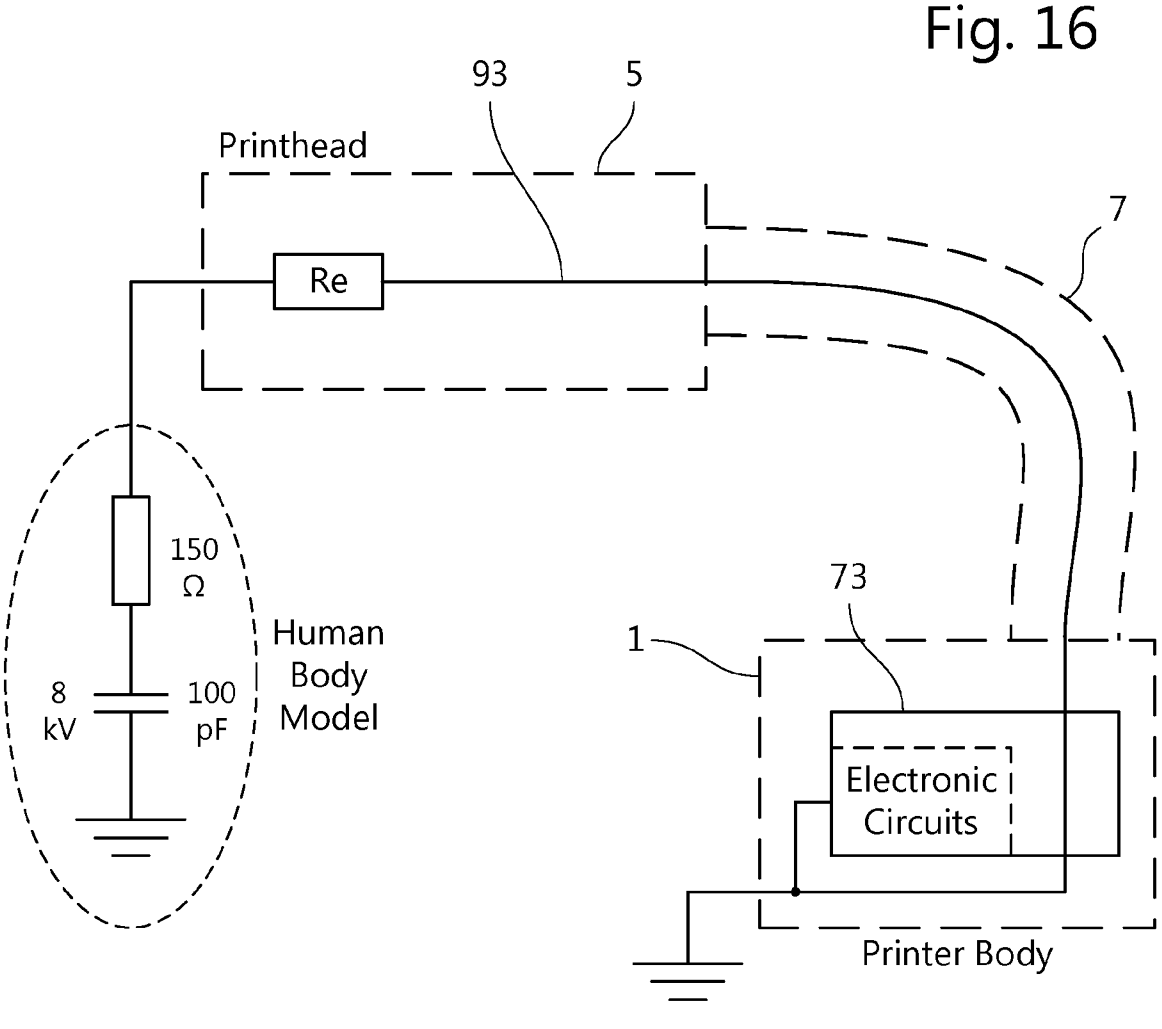
FIG. 16 shows a schematic circuit for modelling the effect of an electrostatic discharge to the print head cover in the case that there are no electronic circuits in the print head.

FIG. 16 shows a further embodiment, in which the print head 5 is simpler and does not include any electronic circuits 103. Therefore there is no signal earth line 97 and no print head signal data lines 101 for the electronic circuits, although there may be other electrical lines for other electrical components such as valves, electrodes and an ink pressure vibration source. In this embodiment, at least the part of the print head cover 83 around the exit hole 85, and preferably the entire print head cover 83, is made from a material having an electrical surface resistivity of at least $10^5$ ohms per square and no more than $10^{12}$ ohms per square or an electrical volume resistivity of at least 100 ohm metres and no more than $10^9$ ohm metres. The material is preferably a mouldable polymeric material. The print head cover 83 may have any of the designs discussed above other than the use of a metal end plate 119 as shown in FIG. 13. The cover earth line 93 extends along the entire length of the umbilical 7 to the control system 73, and the control system 73 provides an earth connection for the cover earth line 93 via the voltage converter 81 to the power socket 79, in the same way as in FIG. 14. The resistance between the place on the print head cover 83 where the electrostatic discharge occurs and the external earth is represented by resistance Re in FIG. 16. Resistance Re is at least 100Ω, in order to limit the current that flows in the cover earth line 93 if there is an electrostatic discharge to the print head cover 83.

If Re is 100Ω, an electrostatic discharge of 8 kV in accordance with the human body model as shown in FIG. 16 will flow through a total of about 250Ω including the resistance in the human body model. This will result in a peak current of about 32 A (or less if there is a significant impedance). Since the current flow is brief, there will be no sustained heating of the cover earth line 93 and so this current can be carried by a 1 mm copper wire without problems.

The earth connection for the print head cover 83 is not a safety earth and the current-limiting effect of Re means that there is no need to provide a stiff metal earth braid or a high-current earth line in the umbilical 7. The cover earth line 93 provides a functional earth, for the purpose of dissipating stray electric charge that might otherwise accumulate on the print head cover 83. However, transient currents carried to the printer body 1 by the cover earth line 93 during an electrostatic discharge event can result in transient potential differences across components in the printer body 1, and these may disturb the correct operation of the system. The resistance Re limits these currents and so limits the degree of electrical disturbance to the printer operation during an electrostatic discharge event.

The minimum practical value for Re is 100Ω. This ensures that there is some effective current limitation, even if there is a discharge in circumstances where the internal resistance of the discharge source is lower than that of the human body model of FIG. 16. However, the current limiting effect is greater, creating less disturbance to the printer operation and making its performance more predictable, if the value of Re is greater and therefore a value of at least 1 kΩ is preferred. This would limit the peak current from an electrostatic discharge of 8 kV to 8 A. Still higher values of Re provide better protection. For example, a resistance Re of at least 8 kΩ would limit the peak current to no more than 1 A. If for example this current flows to earth through the printer chassis, and the connection through the chassis has a resistance of 1Ω, this will result in a voltage change at the chassis of 1 V. It is reasonably straightforward to protect other components from the influence of a voltage fluctuation of this magnitude. Preferably the resistance Re is at least 80 kΩ, so that the peak current is no more than 0.1 A. More preferably the resistance Re is at least 800 kΩ, so that the peak current is no more than 10 mA. This ensures that any voltage fluctuation at the printer body will be very small and would be unlikely to result in any noticeable disruption to the operation of any components in the printer.

The electrical resistivity of the material used for at least a part of the print head cover 83 makes it easy to design the print head cover 83 so that the minimum value for the resistance Re is provided by the material of the print head cover and there is no need to provide a separate resistor 121 in the cover earth line 93. Because the material of the print head cover 83 around the exit hole 85 is not completely insulating, any electrical charges reaching this part of the print head cover are dissipated and do not build up. The use of a mouldable polymeric material enables the print head cover 83 to be made more cheaply than a metal cover.

In the embodiments discussed above, the earth lines 93, 97 and the control system 73 are earthed via the voltage converter 81 and the power socket 79 of FIG. 5. However, it is also possible (for example if the printer body is double insulated) that the components inside the printer are not earthed and instead the earth lines 93, 97 and the control system 73 are connected to an electrical reference which provides a common reference potential for electrical components. An example of this is shown in FIG. 15, where the external casing of the printer body acts as an electrical reference location.

During an electrostatic discharge event, the high frequency components of the discharge will tend to be earthed by capacitive coupling between the printer and other nearby objects. The dc component of the discharge will charge the entire printer, so that its electrical potential relative to earth will change. This will not disrupt the electronic circuits or other electrical components, nor corrupt data, because the potential of all parts of the printer (including both the signal earth line 97 and the signal data lines 101) will be affected equally. Over time, the common electrical reference potential of the printer will slowly return to earth potential by leakage, for example between the secondary and the primary circuits of a power supply plugged into the power socket 79. Preferably, this earth leakage is assisted by a high resistance connection to earth (e.g. in the range of 100 kΩ to 1 MΩ) shown as Rg in FIG. 15. Provided that this high resistance connection is provided in an appropriate manner it need not compromise the double-insulated characteristic of the printer.

As will be appreciated by those skilled in the art, the floating electrical reference arrangement of FIG. 15 may also be applied to FIGS. 10, 14 and 16, and the earthed arrangement of FIGS. 10, 14 and 16 may also be applied to FIG. 15.

As discussed above, the print head cover 83 may be made from an anti-static or static dissipative material. Such materials are often mouldable plastics (typically thermoplastic polymer materials, which may be inherently dissipative polymers or may be other polymers mixed with inherently dissipative polymers and/or non-polymeric conductive materials). Consequently it may be possible to manufacture the print head cover 83 by moulding, allowing it to be made more cheaply than a metal print head cover.

The embodiments described above and illustrated in the drawings are provided by way of non-limiting example and further embodiments are possible. For example, the print head 5 may provide two or more ink jets, rather than a single jet as shown in the illustrated embodiments. The ink gun 17 may provide more than one ink jet, or there may be more than one ink gun 17. Normally, each jet will require a separate independent charge electrode 21 so that the drops of different jets can be charged differently. The jets may share a common set of deflection electrodes 23, 25 provided that the geometry of the print head allows a strong enough deflection field to be provided for each jet, or there may be more than one set of deflection electrodes 23, 25.

The invention claimed is:

1. An electrostatic deflection continuous ink jet printer comprising:

a printer body, a print head and a flexible conduit extending between the printer body and the print head, the print head comprising (a) an ink gun for forming a continuous ink jet, (b) an arrangement of electrodes to trap electric charges on ink drops of the ink jet and to create an electrostatic field to deflect ink drops carrying trapped electric charges, (c) a gutter for receiving ink drops of the ink jet that are not used for printing and (d) a print head cover that extends over at least a part of a volume in which the ink drops travel in operation of the printer, the print head cover having an exit hole to enable ink drops that are used for printing to exit the said volume, wherein the print head cover is made entirely or mostly from a mouldable polymeric material, the printer comprising (e) a cover earth line extending from the print head cover, at least a part of the print head cover having an electrical surface resistivity of no more than $10^{12}$ ohms per square or an electrical volume resistivity of no more than $10^{9}$ ohm.metres, the said at least a part of the print head cover surrounding the exit hole and being electrically connected to the cover earth line.

2. An electrostatic deflection continuous ink jet printer according to claim 1, wherein the cover earth line extends from the print head cover via the flexible conduit to an electrical reference location of the printer body, the electrical resistance Re from every uncovered place on the external surface of the print head cover to the electrical reference location being at least 100 Ω.

3. An electrostatic deflection continuous ink jet printer according to claim 2 in which the electrical resistance Re is at least 1 kΩ.

4. An electrostatic deflection continuous ink jet printer according to claim 2 in which the electrical resistance Re is at least 8 kΩ.

5. An electrostatic deflection continuous ink jet printer according to claim 1, the print head comprising electronic circuits, the printer comprising a signal earth line extending from the electronic circuits of the print head via the flexible conduit to an electrical reference location of the printer body, either (i) the cover earth line extending to join the signal earth line at a place on the signal earth line that is either in the print head or is no more than 10 cm into the flexible conduit from the print head, and the electrical resistance Rc from every uncovered place on the external surface of the print head cover to the said place on the signal earth line being at least 16000 (sixteen thousand) times the electrical resistance from the said place on the signal earth line to the electrical reference location of the printer body, or (ii) the cover earth line extending more than 10 cm into the flexible conduit from the print head and being electrically connected to the electrical reference location of the printer body via the signal earth line or not via the signal earth line, the electrical resistance Rp from every uncovered place on the external surface of the print head cover to a place on the cover earth line that is 10 cm into the flexible conduit being at least 16000 (sixteen thousand) times the electrical resistance from the said place on the cover earth line to the electrical reference location of the printer body.

6. An electrostatic deflection continuous ink jet printer according to claim 5 in which either option (i) applies and the electrical resistance Rc is at least 16000 (sixteen thousand) ohms or option (ii) applies and the electrical resistance Rp is at least 16000 (sixteen thousand) ohms.

7. An electrostatic deflection continuous ink jet printer according to claim 5 in which option (i) applies and the said place on the signal earth line is within the print head.

8. An electrostatic deflection continuous ink jet printer according to claim 1 in which the said at least a part of the print head cover has an electrical surface resistivity of at least $10^{5}$ ohms per square or an electrical volume resistivity of at least 100 ohm.metres.

9. An electrostatic deflection continuous ink jet printer according to claim 1 in which the said at least a part of the print head cover has an electrical surface resistivity of no more than $10^{10}$ ohms per square or an electrical volume resistivity of no more than $10^{7}$ ohm.metres.

10. An electrostatic deflection continuous ink jet printer according to claim 1 in which the said at least a part of the print head cover has an electrical surface resistivity of at least $10^{7}$ ohms per square or an electrical volume resistivity of at least $10^{4}$ ohm.metres.

11. An electrostatic deflection continuous ink jet printer according to claim 1 in which electrical reference location is or is connected to an earth terminal of the printer body.

12. An electrostatic deflection continuous ink jet printer according to claim 1 in which the print head comprises a plurality of ink guns each for forming a respective continuous ink jet or comprises an ink gun for forming a plurality of continuous ink jets.

13. A print head assembly for an electrostatic deflection continuous ink jet printer, the print head assembly comprising:

a print head and a flexible conduit attached to and extending away from the print head, the print head comprising (a) an ink gun for forming a continuous ink jet, (b) an arrangement of electrodes to trap electric charges on ink drops of the ink jet and to create an electrostatic field to deflect ink drops carrying trapped electric charges, (c) a gutter for receiving ink drops of the ink jet that are not used for printing and (d) a print head cover that extends over at least a part of a volume in which the ink drops travel in operation of the printer, the print head cover having an exit hole to enable ink drops that are used for printing to exit the said volume, wherein the print head cover is made entirely or mostly from a mouldable polymeric material, the print head assembly comprising (e) a cover earth line extending from the print head cover, at least a part of the print head cover having an electrical surface resistivity of no more than $10^{12}$ ohms per square or an electrical volume resistivity of no more than $10^{9}$ ohm.metres, the said at least a part of the print head cover surrounding the exit hole and being electrically connected to the cover earth line.

14. A print head assembly according to claim 13, wherein the cover earth line extends from the print head cover along the flexible conduit to a cover earth electrical connector remote from the print head, the electrical resistance Re from every uncovered place on the external surface of the print head cover to the cover earth electrical connector being at least 100 Ω.

15. A print head assembly according to claim 14 in which the electrical resistance Re is at least 1 kΩ.

16. A print head assembly according to claim 13, the print head comprising electronic circuits, the print head assembly comprising a signal earth line extending from the electronic circuits of the print head to and along the flexible conduit to a signal earth electrical connector remote from the print head, either (i) the cover earth line extending to join the signal earth line at a place on the signal earth line that is either in the print head or is no more than 10 cm into the flexible conduit from the print head, and the electrical resistance Rc from every uncovered place on the external surface of the print head cover to the said point on the signal earth line being at least 16000 (sixteen thousand) times the electrical resistance from the said point on the signal earth line to the signal earth electrical connector, or (ii) the cover earth line extending more than 10 cm into the flexible conduit from the print head to join the signal earth line at a place on the signal earth line within the flexible conduit, and the electrical resistance Rp from every uncovered place on the external surface of the print head cover to a place on the cover earth line that is 10 cm into the flexible conduit being at least 16000 (sixteen thousand) times the electrical resistance from the said place on the cover earth line to the signal earth electrical connector, or (iii) the cover earth line extending more than 10 cm into the flexible conduit from the print head and extending along the flexible conduit to a cover earth electrical connector remote from the print head, the electrical resistance Rp from every uncovered place on the external surface of the print head cover to a place on the cover earth line that is 10 cm into the flexible conduit being at least 16000 (sixteen thousand) times the electrical resistance from the said place on the cover earth line to the cover earth electrical connector.

17. A print head assembly according to claim 13 in which the said at least a part of the print head cover has an electrical surface resistivity of at least $10^5$ ohms per square or an electrical volume resistivity of at least 100 ohm.metres.

18. A print head assembly according to claim 13 in which the said at least a part of the print head cover has an electrical surface resistivity of no more than $10^{10}$ ohms per square or an electrical volume resistivity of no more than $10^7$ ohm-.metres.

19. A print head assembly according to claim 13 in which the said at least a part of the print head cover has an electrical surface resistivity of at least $10^7$ ohms per square or an electrical volume resistivity of at least $10^4$ ohm.metres.

20. A print head assembly according to claim 13 in which the print head comprises a plurality of ink guns each for forming a respective continuous ink jet or comprises an ink gun for forming a plurality of continuous ink jets.

* * * * *